United States Patent
Barday et al.

(10) Patent No.: US 10,235,534 B2
(45) Date of Patent: Mar. 19, 2019

(54) DATA PROCESSING SYSTEMS FOR PRIORITIZING DATA SUBJECT ACCESS REQUESTS FOR FULFILLMENT AND RELATED METHODS

(71) Applicant: OneTrust, LLC, Atlanta, GA (US)

(72) Inventors: Kabir A. Barday, Atlanta, GA (US); Jason L. Sabourin, Brookhaven, GA (US); Jonathan Blake Brannon, Smyrna, GA (US); Mihir S. Karanjkar, Marietta, GA (US); Kevin Jones, Atlanta, GA (US)

(73) Assignee: OneTrust, LLC, Atlanta, GA (US)

( * ) Notice: Subject to any disclaimer, the term of this patent is extended or adjusted under 35 U.S.C. 154(b) by 0 days.

(21) Appl. No.: 16/054,762

(22) Filed: Aug. 3, 2018

(65) Prior Publication Data
US 2018/0341783 A1    Nov. 29, 2018

Related U.S. Application Data

(63) Continuation-in-part of application No. 15/996,208, filed on Jun. 1, 2018, which is a continuation-in-part
(Continued)

(51) Int. Cl.
| | | |
|---|---|---|
| G06F 9/44 | (2018.01) | |
| G06F 21/62 | (2013.01) | |
| G06F 9/48 | (2006.01) | |

(52) U.S. Cl.
CPC ........ *G06F 21/6245* (2013.01); *G06F 9/4881* (2013.01)

(58) Field of Classification Search
CPC .......................... G06F 21/6245; G06F 9/4881
(Continued)

(56) References Cited

U.S. PATENT DOCUMENTS

| 5,276,735 A | 1/1994 | Boebert et al. |
|---|---|---|
| 6,253,203 B1 | 6/2001 | OFlaherty et al. |

(Continued)

FOREIGN PATENT DOCUMENTS

| EP | 1394698 | 3/2004 |
|---|---|---|
| EP | 2031540 | 3/2009 |

(Continued)

OTHER PUBLICATIONS

Notice of Allowance, dated Jan. 26, 2018, from corresponding U.S. Appl. No. 15/619,469.

(Continued)

*Primary Examiner* — Anna C Deng
(74) *Attorney, Agent, or Firm* — Brient IP Law, LLC

(57) ABSTRACT

In various embodiments, a data subject request fulfillment system may be adapted to prioritize the processing of data subject access requests based on metadata of the data subject access request. For example, the system may be adapted for: (1) in response to receiving a data subject access request, obtaining metadata regarding the data subject; (2) using the metadata to determine whether a priority of the data subject access request should be adjusted based on the obtained metadata; and (3) in response to determining that the priority of the data subject access request should be adjusted based on the obtained metadata, adjusting the priority of the data subject access request.

19 Claims, 51 Drawing Sheets

Related U.S. Application Data of application No. 15/853,674, filed on Dec. 22, 2017, now Pat. No. 10,019,597, which is a continuation-in-part of application No. 15/619,455, filed on Jun. 10, 2017, now Pat. No. 9,851,966, which is a continuation-in-part of application No. 15/254,901, filed on Sep. 1, 2016, now Pat. No. 9,729,583.

(60) Provisional application No. 62/360,123, filed on Jul. 8, 2016, provisional application No. 62/353,802, filed on Jun. 23, 2016, provisional application No. 62/348,695, filed on Jun. 10, 2016, provisional application No. 62/541,613, filed on Aug. 4, 2017, provisional application No. 62/537,839, filed on Jul. 27, 2017, provisional application No. 62/547,530, filed on Aug. 18, 2017.

(58) Field of Classification Search
USPC .................................................. 717/101
See application file for complete search history.

(56) References Cited

U.S. PATENT DOCUMENTS

| | | | |
|---|---|---|---|
| 6,275,824 B1 | 8/2001 | OFlaherty et al. |
| 6,374,252 B1 | 4/2002 | Althoff et al. |
| 6,816,944 B2 | 11/2004 | Peng |
| 6,901,346 B2 | 5/2005 | Tracy et al. |
| 6,904,417 B2 | 6/2005 | Clayton et al. |
| 6,925,443 B1 | 8/2005 | Baggett, Jr. et al. |
| 6,983,221 B2 | 1/2006 | Tracy et al. |
| 6,993,448 B2 | 1/2006 | Tracy et al. |
| 6,993,495 B2 | 1/2006 | Smith, Jr. et al. |
| 7,013,290 B2 | 3/2006 | Ananian |
| 7,017,105 B2 | 3/2006 | Flanagin et al. |
| 7,058,970 B2 | 6/2006 | Shaw |
| 7,069,427 B2 | 6/2006 | Adler et al. |
| 7,127,741 B2 | 10/2006 | Bandini et al. |
| 7,203,929 B1 | 4/2007 | Vinodkrishnan et al. |
| 7,213,233 B1 | 5/2007 | Vinodkrishnan et al. |
| 7,216,340 B1 | 5/2007 | Vinodkrishnan et al. |
| 7,223,234 B2 | 5/2007 | Stupp et al. |
| 7,234,065 B2 * | 6/2007 | Breslin ............. G06Q 10/10 713/165 |
| 7,251,624 B1 | 7/2007 | Lee et al. |
| 7,260,830 B2 | 8/2007 | Sugimoto |
| 7,287,280 B2 | 10/2007 | Young |
| 7,290,275 B2 | 10/2007 | Baudoin et al. |
| 7,313,575 B2 | 12/2007 | Carr et al. |
| 7,391,854 B2 | 6/2008 | Salonen et al. |
| 7,412,402 B2 | 8/2008 | Cooper |
| 7,478,157 B2 | 1/2009 | Bohrer et al. |
| 7,512,987 B2 | 3/2009 | Williams |
| 7,516,882 B2 | 4/2009 | Cucinotta |
| 7,523,053 B2 | 4/2009 | Pudhukottai et al. |
| 7,548,968 B1 | 6/2009 | Bura et al. |
| 7,584,505 B2 | 9/2009 | Mondri et al. |
| 7,603,356 B2 | 10/2009 | Schran et al. |
| 7,613,700 B1 | 11/2009 | Lobo et al. |
| 7,630,998 B2 | 12/2009 | Zhou et al. |
| 7,636,742 B1 | 12/2009 | Olavarrieta et al. |
| 7,668,947 B2 | 2/2010 | Hutchinson et al. |
| 7,673,282 B2 | 3/2010 | Amaru et al. |
| 7,707,224 B2 | 4/2010 | Chastagnol et al. |
| 7,716,242 B2 | 5/2010 | Pae et al. |
| 7,729,940 B2 | 6/2010 | Harvey et al. |
| 7,730,142 B2 | 6/2010 | Levasseur et al. |
| 7,756,987 B2 | 7/2010 | Wang et al. |
| 7,788,632 B2 | 8/2010 | Kuester et al. |
| 7,801,758 B2 | 9/2010 | Gracie et al. |
| 7,853,468 B2 | 12/2010 | Callahan et al. |
| 7,870,608 B2 | 1/2011 | Shraim et al. |
| 7,877,812 B2 | 1/2011 | Koved et al. |
| 7,885,841 B2 | 2/2011 | King |
| 7,917,963 B2 | 3/2011 | Goyal et al. |
| 7,966,310 B2 | 6/2011 | Sullivan et al. |
| 7,966,663 B2 | 6/2011 | Strickland et al. |
| 7,991,559 B2 | 8/2011 | Dzekunov et al. |
| 8,019,881 B2 | 9/2011 | Sandhu et al. |
| 8,032,721 B2 | 10/2011 | Murai |
| 8,037,409 B2 | 10/2011 | Jacob et al. |
| 8,041,913 B2 | 10/2011 | Wang |
| 8,146,074 B2 | 3/2012 | Ito et al. |
| 8,150,717 B2 | 4/2012 | Whitmore |
| 8,156,158 B2 | 4/2012 | Rolls et al. |
| 8,176,177 B2 | 5/2012 | Sussman et al. |
| 8,176,334 B2 | 5/2012 | Vainstein |
| 8,180,759 B2 | 5/2012 | Hamzy |
| 8,239,244 B2 | 8/2012 | Ginsberg et al. |
| 8,286,239 B1 | 10/2012 | Sutton |
| 8,364,713 B2 | 1/2013 | Pollard |
| 8,418,226 B2 | 4/2013 | Gardner |
| 8,438,644 B2 | 5/2013 | Watters et al. |
| 8,494,894 B2 | 7/2013 | Jaster et al. |
| 8,504,481 B2 | 8/2013 | Motahari et al. |
| 8,578,036 B1 | 11/2013 | Holfelder et al. |
| 8,578,166 B2 | 11/2013 | De Monseignat et al. |
| 8,578,481 B2 | 11/2013 | Rowley |
| 8,583,694 B2 | 11/2013 | Siegel et al. |
| 8,601,591 B2 | 12/2013 | Krishnamurthy et al. |
| 8,606,746 B2 | 12/2013 | Yeap et al. |
| 8,612,420 B2 | 12/2013 | Sun et al. |
| 8,612,993 B2 | 12/2013 | Grant et al. |
| 8,621,637 B2 | 12/2013 | Al-Harbi et al. |
| 8,681,984 B2 | 3/2014 | Lee et al. |
| 8,683,502 B2 | 3/2014 | Shkedi et al. |
| 8,688,601 B2 | 4/2014 | Jaiswal |
| 8,706,742 B1 | 4/2014 | Ravid et al. |
| 8,712,813 B2 | 4/2014 | King |
| 8,744,894 B2 | 6/2014 | Christiansen et al. |
| 8,763,071 B2 | 6/2014 | Sinha et al. |
| 8,767,947 B1 | 7/2014 | Ristock et al. |
| 8,805,707 B2 | 8/2014 | Schumann, Jr. et al. |
| 8,805,925 B2 | 8/2014 | Price et al. |
| 8,812,342 B2 | 8/2014 | Barcelo et al. |
| 8,819,253 B2 | 8/2014 | Simeloff et al. |
| 8,826,446 B1 * | 9/2014 | Liu ................. G06F 21/6245 726/1 |
| 8,843,487 B2 | 9/2014 | McGraw et al. |
| 8,893,286 B1 | 11/2014 | Oliver |
| 8,914,263 B2 | 12/2014 | Shimada et al. |
| 8,914,299 B2 | 12/2014 | Pesci-Anderson et al. |
| 8,914,342 B2 | 12/2014 | Kalaboukis et al. |
| 8,935,266 B2 | 1/2015 | Wu |
| 8,943,076 B2 | 1/2015 | Stewart et al. |
| 8,959,584 B2 | 2/2015 | Piliouras |
| 8,966,575 B2 | 2/2015 | McQuay et al. |
| 8,977,234 B2 | 3/2015 | Chava |
| 8,983,972 B2 | 3/2015 | Kriebel et al. |
| 8,990,933 B1 | 3/2015 | Magdalin |
| 8,997,213 B2 | 3/2015 | Papakipos et al. |
| 9,043,217 B2 | 5/2015 | Cashman et al. |
| 9,047,582 B2 | 6/2015 | Hutchinson et al. |
| 9,069,940 B2 | 6/2015 | Hars |
| 9,092,796 B2 | 7/2015 | Eversoll et al. |
| 9,094,434 B2 | 7/2015 | Williams et al. |
| 9,098,515 B2 | 8/2015 | Richter et al. |
| 9,111,295 B2 | 8/2015 | Tietzen et al. |
| 9,129,311 B2 | 9/2015 | Schoen et al. |
| 9,135,261 B2 | 9/2015 | Maunder et al. |
| 9,152,820 B1 | 10/2015 | Pauley, Jr. et al. |
| 9,158,655 B2 | 10/2015 | Wadhwani et al. |
| 9,172,706 B2 | 10/2015 | Krishnamurthy et al. |
| 9,178,901 B2 | 11/2015 | Xue et al. |
| 9,202,085 B2 | 12/2015 | Mawdsley et al. |
| 9,215,252 B2 | 12/2015 | Smith et al. |
| 9,232,040 B2 | 1/2016 | Barash et al. |
| 9,235,476 B2 | 1/2016 | McHugh et al. |
| 9,241,259 B2 | 1/2016 | Daniela et al. |
| 9,245,126 B2 | 1/2016 | Christodorescu et al. |
| 9,288,118 B1 | 3/2016 | Pattan |
| 9,317,715 B2 | 4/2016 | Schuette et al. |
| 9,336,332 B2 | 5/2016 | Davis et al. |
| 9,336,400 B2 | 5/2016 | Milman et al. |

(56) References Cited

U.S. PATENT DOCUMENTS

| | | |
|---|---|---|
| 9,338,188 B1 | 5/2016 | Ahn |
| 9,344,424 B2 | 5/2016 | Tenenboym et al. |
| 9,348,802 B2 | 5/2016 | Massand |
| 9,369,488 B2 | 6/2016 | Woods et al. |
| 9,384,357 B2 * | 7/2016 | Patil .................. G06F 21/60 |
| 9,386,104 B2 | 7/2016 | Adams et al. |
| 9,401,900 B2 | 7/2016 | Levasseur et al. |
| 9,424,021 B2 | 8/2016 | Zamir |
| 9,462,009 B1 | 10/2016 | Kolman et al. |
| 9,465,800 B2 | 10/2016 | Lacey |
| 9,477,660 B2 | 10/2016 | Scott et al. |
| 9,477,942 B2 | 10/2016 | Adachi et al. |
| 9,483,659 B2 | 11/2016 | Bao et al. |
| 9,507,960 B2 | 11/2016 | Bell et al. |
| 9,521,166 B2 | 12/2016 | Wilson |
| 9,549,047 B1 | 1/2017 | Fredinburg et al. |
| 9,558,497 B2 | 1/2017 | Carvalho |
| 9,571,509 B1 | 2/2017 | Satish et al. |
| 9,602,529 B2 | 3/2017 | Jones et al. |
| 9,621,566 B2 | 4/2017 | Gupta et al. |
| 9,646,095 B1 | 5/2017 | Gottlieb et al. |
| 9,648,036 B2 | 5/2017 | Seiver et al. |
| 9,652,314 B2 | 5/2017 | Mahiddini |
| 9,654,541 B1 | 5/2017 | Kapczynski et al. |
| 9,665,722 B2 | 5/2017 | Nagasundaram et al. |
| 9,672,053 B2 | 6/2017 | Tang et al. |
| 9,691,090 B1 | 6/2017 | Barday |
| 9,721,078 B2 | 8/2017 | Cornick et al. |
| 9,721,108 B2 | 8/2017 | Krishnamurthy et al. |
| 9,729,583 B1 | 8/2017 | Barday |
| 9,740,985 B2 | 8/2017 | Byron et al. |
| 9,740,987 B2 | 8/2017 | Dolan |
| 9,749,408 B2 | 8/2017 | Subramani et al. |
| 9,760,620 B2 | 9/2017 | Nachnani et al. |
| 9,760,697 B1 | 9/2017 | Walker |
| 9,762,553 B2 | 9/2017 | Ford et al. |
| 9,767,309 B1 | 9/2017 | Patel et al. |
| 9,800,605 B2 | 10/2017 | Baikalov et al. |
| 9,804,928 B2 | 10/2017 | Davis et al. |
| 9,811,532 B2 | 11/2017 | Parkison et al. |
| 9,817,850 B2 | 11/2017 | Dubbels et al. |
| 9,838,407 B1 | 12/2017 | Oprea et al. |
| 9,852,150 B2 | 12/2017 | Sharpe et al. |
| 9,882,935 B2 | 1/2018 | Barday |
| 9,892,441 B2 | 2/2018 | Barday |
| 9,892,442 B2 | 2/2018 | Barday |
| 9,892,443 B2 | 2/2018 | Barday |
| 9,892,444 B2 | 2/2018 | Barday |
| 9,898,769 B2 | 2/2018 | Barday |
| 9,912,625 B2 | 3/2018 | Mutha et al. |
| 9,916,703 B2 | 3/2018 | Douillard et al. |
| 9,983,936 B2 | 5/2018 | Dornemann et al. |
| 9,992,213 B2 | 6/2018 | Sinnema |
| 10,002,064 B2 | 6/2018 | Muske |
| 10,013,577 B1 | 7/2018 | Beaumont et al. |
| 10,032,172 B2 | 7/2018 | Barday |
| 10,044,761 B2 | 8/2018 | Ducatel et al. |
| 10,055,426 B2 | 8/2018 | Arasan et al. |
| 10,102,533 B2 | 10/2018 | Barday |
| 10,158,676 B2 | 12/2018 | Barday |
| 10,165,011 B2 | 12/2018 | Barday |
| 2002/0161594 A1 | 10/2002 | Bryan et al. |
| 2003/0041250 A1 | 2/2003 | Proudler |
| 2005/0022198 A1 | 1/2005 | Olapurath et al. |
| 2005/0144066 A1 | 6/2005 | Cope et al. |
| 2005/0197884 A1 | 9/2005 | Mullen, Jr. |
| 2006/0015263 A1 * | 1/2006 | Stupp .................. G06F 17/18 702/19 |
| 2006/0031078 A1 | 2/2006 | Pizzinger et al. |
| 2006/0075122 A1 | 4/2006 | Lindskog et al. |
| 2007/0027715 A1 | 2/2007 | Gropper et al. |
| 2007/0130101 A1 | 6/2007 | Anderson et al. |
| 2007/0157311 A1 | 7/2007 | Meier et al. |
| 2007/0180490 A1 | 8/2007 | Renzi et al. |
| 2007/0266420 A1 * | 11/2007 | Hawkins ............... G06F 21/552 726/1 |
| 2007/0283171 A1 | 12/2007 | Breslin et al. |
| 2008/0015927 A1 | 1/2008 | Ramirez |
| 2008/0028435 A1 * | 1/2008 | Strickland ............ G06Q 10/083 726/1 |
| 2008/0047016 A1 | 2/2008 | Spoonamore |
| 2008/0120699 A1 | 5/2008 | Spear |
| 2008/0270203 A1 | 10/2008 | Holmes et al. |
| 2008/0288271 A1 | 11/2008 | Faust |
| 2009/0037975 A1 | 2/2009 | Ishikawa et al. |
| 2009/0182818 A1 | 7/2009 | Krywaniuk |
| 2009/0204452 A1 | 8/2009 | Iskandar et al. |
| 2009/0216610 A1 | 8/2009 | Chorny |
| 2009/0249076 A1 | 10/2009 | Reed et al. |
| 2009/0303237 A1 | 12/2009 | Liu et al. |
| 2010/0100398 A1 | 4/2010 | Auker et al. |
| 2010/0121773 A1 | 5/2010 | Currier et al. |
| 2010/0192201 A1 | 7/2010 | Shimoni et al. |
| 2010/0205057 A1 | 8/2010 | Hook et al. |
| 2010/0228786 A1 | 9/2010 | Török |
| 2010/0235915 A1 | 9/2010 | Memon et al. |
| 2010/0268628 A1 | 10/2010 | Pitkow et al. |
| 2010/0281313 A1 | 11/2010 | White et al. |
| 2010/0333012 A1 | 12/2010 | Adachi et al. |
| 2011/0010202 A1 | 1/2011 | Neale |
| 2011/0137696 A1 | 6/2011 | Meyer et al. |
| 2011/0231896 A1 | 9/2011 | Tovar |
| 2012/0084349 A1 | 4/2012 | Lee et al. |
| 2012/0102543 A1 | 4/2012 | Kohli et al. |
| 2012/0110674 A1 | 5/2012 | Belani et al. |
| 2012/0116923 A1 | 5/2012 | Irving et al. |
| 2012/0143650 A1 | 6/2012 | Crowley et al. |
| 2012/0144499 A1 | 6/2012 | Tan et al. |
| 2012/0259752 A1 | 10/2012 | Agee |
| 2013/0018954 A1 | 1/2013 | Cheng |
| 2013/0111323 A1 | 5/2013 | Taghaddos et al. |
| 2013/0218829 A1 | 8/2013 | Martinez |
| 2013/0311224 A1 | 11/2013 | Heroux et al. |
| 2013/0326112 A1 | 12/2013 | Park et al. |
| 2013/0332362 A1 | 12/2013 | Ciurea |
| 2013/0340086 A1 | 12/2013 | Blom |
| 2014/0006616 A1 | 1/2014 | Aad et al. |
| 2014/0012833 A1 | 1/2014 | Humprecht |
| 2014/0032265 A1 | 1/2014 | Paprocki |
| 2014/0040134 A1 | 2/2014 | Ciurea |
| 2014/0040161 A1 | 2/2014 | Berlin |
| 2014/0047551 A1 | 2/2014 | Nagasundaram et al. |
| 2014/0052463 A1 | 2/2014 | Cashman et al. |
| 2014/0089027 A1 | 3/2014 | Brown |
| 2014/0089039 A1 | 3/2014 | McClellan |
| 2014/0208418 A1 | 7/2014 | Libin |
| 2014/0244309 A1 | 8/2014 | Francois |
| 2014/0244399 A1 | 8/2014 | Orduna et al. |
| 2014/0278663 A1 | 9/2014 | Samuel et al. |
| 2014/0283027 A1 | 9/2014 | Orona et al. |
| 2014/0283106 A1 | 9/2014 | Stahura et al. |
| 2014/0288971 A1 | 9/2014 | Whibbs, III |
| 2014/0289862 A1 | 9/2014 | Gorfein et al. |
| 2014/0337466 A1 | 11/2014 | Li et al. |
| 2014/0344015 A1 | 11/2014 | Puértolas-Montañés et al. |
| 2015/0019530 A1 | 1/2015 | Felch |
| 2015/0066577 A1 | 3/2015 | Christiansen et al. |
| 2015/0095352 A1 * | 4/2015 | Lacey ............... G06F 17/30011 707/752 |
| 2015/0106867 A1 | 4/2015 | Liang |
| 2015/0106948 A1 | 4/2015 | Holman et al. |
| 2015/0106949 A1 | 4/2015 | Holman et al. |
| 2015/0169318 A1 | 6/2015 | Nash |
| 2015/0178740 A1 | 6/2015 | Borawski et al. |
| 2015/0229664 A1 | 8/2015 | Hawthorn et al. |
| 2015/0242778 A1 | 8/2015 | Wilcox et al. |
| 2015/0254597 A1 | 9/2015 | Jahagirdar |
| 2015/0261887 A1 | 9/2015 | Joukov |
| 2015/0269384 A1 | 9/2015 | Holman et al. |
| 2015/0356362 A1 | 12/2015 | Demos |
| 2015/0379430 A1 | 12/2015 | Dirac et al. |
| 2016/0026394 A1 | 1/2016 | Goto |
| 2016/0034918 A1 | 2/2016 | Bjelajac et al. |

(56) References Cited

U.S. PATENT DOCUMENTS

| | | | |
|---|---|---|---|
| 2016/0048700 A1 | 2/2016 | Stransky-Heilkron | |
| 2016/0063523 A1 | 3/2016 | Nistor et al. | |
| 2016/0063567 A1 | 3/2016 | Srivastava | |
| 2016/0071112 A1 | 3/2016 | Unser | |
| 2016/0099963 A1 | 4/2016 | Mahaffey et al. | |
| 2016/0125751 A1 | 5/2016 | Barker et al. | |
| 2016/0148143 A1 | 5/2016 | Anderson et al. | |
| 2016/0162269 A1 | 6/2016 | Pogorelik et al. | |
| 2016/0234319 A1 | 8/2016 | Griffin | |
| 2016/0321748 A1 | 11/2016 | Mahatma et al. | |
| 2016/0330237 A1 | 11/2016 | Edlabadkar | |
| 2016/0342811 A1 | 11/2016 | Whitcomb et al. | |
| 2016/0364736 A1 | 12/2016 | Maugans, III | |
| 2016/0370954 A1 | 12/2016 | Burningham et al. | |
| 2016/0381064 A1 | 12/2016 | Chan et al. | |
| 2016/0381560 A1* | 12/2016 | Margaliot | H04L 63/08 726/4 |
| 2017/0004055 A1 | 1/2017 | Horan et al. | |
| 2017/0115864 A1 | 4/2017 | Thomas et al. | |
| 2017/0140174 A1 | 5/2017 | Lacey et al. | |
| 2017/0142158 A1 | 5/2017 | Laoutaris et al. | |
| 2017/0161520 A1 | 6/2017 | Lockhart, III et al. | |
| 2017/0171235 A1 | 6/2017 | Mulchandani et al. | |
| 2017/0177324 A1 | 6/2017 | Frank et al. | |
| 2017/0180505 A1* | 6/2017 | Shaw | H04L 67/306 |
| 2017/0193624 A1 | 7/2017 | Tsai | |
| 2017/0201518 A1 | 7/2017 | Holmqvist et al. | |
| 2017/0206707 A1 | 7/2017 | Guay et al. | |
| 2017/0220964 A1 | 8/2017 | Datta | |
| 2017/0249710 A1 | 8/2017 | Guillama et al. | |
| 2017/0270318 A1 | 9/2017 | Ritchie | |
| 2017/0286719 A1 | 10/2017 | Krishnamurthy et al. | |
| 2017/0330197 A1 | 11/2017 | DiMaggio et al. | |
| 2018/0063174 A1 | 3/2018 | Grill et al. | |
| 2018/0063190 A1 | 3/2018 | Wright et al. | |
| 2018/0091476 A1 | 3/2018 | Jakobsson et al. | |
| 2018/0285887 A1 | 10/2018 | Maung | |

FOREIGN PATENT DOCUMENTS

| | | |
|---|---|---|
| WO | 2001033430 | 5/2001 |
| WO | 2005008411 | 1/2005 |
| WO | 2007002412 | 1/2007 |
| WO | 2012174659 | 12/2012 |
| WO | 2015116905 | 8/2015 |

OTHER PUBLICATIONS

Notice of Allowance, dated Jun. 19, 2018, from corresponding U.S. Appl. No. 15/894,890.
Notice of Allowance, dated Jun. 27, 2018, from corresponding U.S. Appl. No. 15/882,989.
Notice of Allowance, dated Jun. 6, 2018, from corresponding U.S. Appl. No. 15/875,570.
Notice of Allowance, dated Mar. 1, 2018, from corresponding U.S. Appl. No. 15/853,674.
Notice of Allowance, dated Mar. 2, 2018, from corresponding U.S. Appl. No. 15/858,802.
Notice of Allowance, dated May 21, 2018, from corresponding U.S. Appl. No. 15/896,790.
Notice of Allowance, dated May 5, 2017, from corresponding U.S. Appl. No. 15/254,901.
Notice of Allowance, dated Nov. 7, 2017, from corresponding U.S. Appl. No. 15/671,073.
Notice of Allowance, dated Sep. 13, 2018, from corresponding U.S. Appl. No. 15/894,809.
Notice of Allowance, dated Sep. 13, 2018, from corresponding U.S. Appl. No. 15/894,890.
Notice of Allowance, dated Sep. 27, 2017, from corresponding U.S. Appl. No. 15/626,052.
Notice of Allowance, dated Sep. 4, 2018, from corresponding U.S. Appl. No. 15/883,041.
Notice of Filing Date for Petition for Post-Grand Review of related U.S. Pat. No. 9,691,090 dated Apr. 12, 2018.
Office Action, dated Apr. 18, 2018, from corresponding U.S. Appl. No. 15/894,819.
Office Action, dated Aug. 23, 2017, from corresponding U.S. Appl. No. 15/626,052.
Office Action, dated Aug. 24, 2017, from corresponding U.S. Appl. No. 15/169,643.
Office Action, dated Aug. 24, 2017, from corresponding U.S. Appl. No. 15/619,451.
Office Action, dated Aug. 29, 2017, from corresponding U.S. Appl. No. 15/619,237.
Office Action, dated Aug. 30, 2017, from corresponding U.S. Appl. No. 15/619,212.
Office Action, dated Aug. 30, 2017, from corresponding U.S. Appl. No. 15/619,382.
Office Action, dated Dec. 15, 2016, from corresponding U.S. Appl. No. 15/256,419.
Office Action, dated Jul. 21, 2017, from corresponding U.S. Appl. No. 15/256,430.
Office Action, dated Mar. 30, 2018, from corresponding U.S. Appl. No. 15/894,890.
Office Action, dated Mar. 30, 2018, from corresponding U.S. Appl. No. 15/896,790.
Office Action, dated May 16, 2018, from corresponding U.S. Appl. No. 15/882,989.
Office Action, dated May 2, 2018, from corresponding U.S. Appl. No. 15/894,809.
Office Action, dated Nov. 1, 2017, from corresponding U.S. Appl. No. 15/169,658.
Office Action, dated Sep. 1, 2017, from corresponding U.S. Appl. No. 15/619,459.
Office Action, dated Sep. 11, 2017, from corresponding U.S. Appl. No. 15/619,375.
Office Action, dated Sep. 11, 2017, from corresponding U.S. Appl. No. 15/619,478.
Office Action, dated Sep. 19, 2017, from corresponding U.S. Appl. No. 15/671,073.
Office Action, dated Sep. 22, 2017, from corresponding U.S. Appl. No. 15/619,278.
Office Action, dated Sep. 5, 2017, from corresponding U.S. Appl. No. 15/619,469.
Office Action, dated Sep. 6, 2017, from corresponding U.S. Appl. No. 15/619,479.
Office Action, dated Sep. 7, 2017, from corresponding U.S. Appl. No. 15/633,703.
Office Action, dated Sep. 8, 2017, from corresponding U.S. Appl. No. 15/619,251.
Petition for Post-Grant Review of related U.S. Pat. No. 9,691,090 dated Mar. 27, 2018.
Pfeifle, Sam, The Privacy Advisor, IAPP and AvePoint Launch New Free PIA Tool, International Association of Privacy Professionals, Mar. 5, 2014.
Pfeifle, Sam, The Privacy Advisor, IAPP Heads to Singapore with APIA Template in Tow, International Association of Privacy Professionals, https://iapp.org/news/a/iapp-heads-to-singapore-with-apia-template_in_tow/, Mar. 28, 2014, p. 1-3.
Restriction Requirement, dated Jan. 18, 2017, from corresponding U.S. Appl. No. 15/256,430.
Restriction Requirement, dated Jul. 28, 2017, from corresponding U.S. Appl. No. 15/169,658.
Restriction Requirement, dated Nov. 21, 2016, from corresponding U.S. Appl. No. 15/254,901.
Schwartz, Edward J., et al, 2010 IEEE Symposium on Security and Privacy: All You Ever Wanted to Know About Dynamic Analysis and forward Symbolic Execution (but might have been afraid to ask), Carnegie Mellon University, IEEE Computer Society, 2010, p. 317-331.
Symantec, Symantex Data Loss Prevention—Discover, monitor, and protect confidential data; 2008; Symantec Corporation; http://www.mssuk.com/images/Symantec%2014552315_IRC_BR_DLP_03.09_sngl.pdf.

(56) References Cited

OTHER PUBLICATIONS

TRUSTe Announces General Availability of Assessment Manager for Enterprises to Streamline Data Privacy Management with Automation, PRNewswire, Mar. 4, 2015.
Written Opinion of the International Searching Authority, dated Jun. 6, 2017, from corresponding International Application No. PCT/US2017/025611.
Written Opinion of the International Searching Authority, dated Aug. 15, 2017, from corresponding International Application No. PCT/US2017/036919.
Written Opinion of the International Searching Authority, dated Aug. 21, 2017, from corresponding International Application No. PCT/US2017/036914.
Written Opinion of the International Searching Authority, dated Aug. 29, 2017, from corresponding International Application No. PCT/US2017/036898.
Aghasian, Erfan, et al, Scoring Users' Privacy Disclosure Across Multiple Online Social Networks, IEEE Access, Multidisciplinary Rapid Review Open Access Journal, Jul. 31, 2017, vol. 5, 2017.
Liu, Kun, et al, A Framework for Computing the Privacy Scores of Users in Online Social Networks, ACM Transactions on Knowledge Discovery from Data, vol. 5, No. 1, Article 6, Dec. 2010, 30 pages.
Srivastava, Agrima, et al, Measuring Privacy Leaks in Online Social Networks, International Conference on Advances in Computing, Communications and Informatics (ICACCI), 2013.
Written Opinion of the International Searching Authority, dated Aug. 8, 2017, from corresponding International Application No. PCT/US2017/036889.
Written Opinion of the International Searching Authority, dated Aug. 8, 2017, from corresponding International Application No. PCT/US2017/036890.
Written Opinion of the International Searching Authority, dated Aug. 8, 2017, from corresponding International Application No. PCT/US2017/036893.
Written Opinion of the International Searching Authority, dated Aug. 8, 2017, from corresponding International Application No. PCT/US2017/036901.
Written Opinion of the International Searching Authority, dated Aug. 8, 2017, from corresponding International Application No. PCT/US2017/036913.
Written Opinion of the International Searching Authority, dated Aug. 8, 2017, from corresponding International Application No. PCT/US2017/036920.
Written Opinion of the International Searching Authority, dated Jun. 21, 2017, from corresponding International Application No. PCT/US2017/025600.
Written Opinion of the International Searching Authority, dated Jun. 6, 2017, from corresponding International Application No. PCT/US2017/025605.
Written Opinion of the International Searching Authority, dated Oct. 12, 2017, from corresponding International Application No. PCT/US2017/036888.
Written Opinion of the International Searching Authority, dated Oct. 20, 2017, from corresponding International Application No. PCT/US2017/036917.
Written Opinion of the International Searching Authority, dated Oct. 3, 2017, from corresponding International Application No. PCT/US2017/036912.
Written Opinion of the International Searching Authority, dated Sep. 1, 2017, from corresponding International Application No. PCT/US2017/036896.
www.truste.com (1), 200150207, Internet Archive Wayback Machine, www.archive.org,2_7_2015.
Notice of Allowance, dated Sep. 18, 2018, from corresponding U.S. Appl. No. 15/894,819.
Notice of Allowance, dated Sep. 18, 2018, from corresponding U.S. Appl. No. 16/041,545.
Notice of Allowance, dated Sep. 28, 2018, from corresponding U.S. Appl. No. 16/041,520.
Acar, Gunes, et al, The Web Never Forgets, Computer and Communications Security, ACM, Nov. 3, 2014, pp. 674-689.
Falahrastegar, Marjan, et al., Tracking Personal Identifiers Across the Web, Medical Image Computing and Computer-Assisted Intervention—Miccai 2015, 18th International Conference, Oct. 5, 2015, Munich, Germany.
International Search Report, dated Sep. 12, 2018, from corresponding International Application No. PCT/US2018/037504.
Written Opinion of the International Searching Authority, dated Sep. 12, 2018, from corresponding International Application No. PCT/US2018/037504.
Hacigümüs, Hakan, et al, Executing SQL over Encrypted Data in the Database-Service-Provider Model, ACM, Jun. 4, 2002, pp. 216-227.
Krol, Kat, et al, Control versus Effort in Privacy Warnings for Webforms, ACM, Oct. 24, 2016, pp. 13-23.
Office Action, dated Oct. 10, 2018, from corresponding U.S. Appl. No. 16/041,563.
Office Action, dated Oct. 10, 2018, from corresponding U.S. Appl. No. 16/055,083.
Office Action, dated Oct. 10, 2018, from corresponding U.S. Appl. No. 16/055,944.
Office Action, dated Oct. 15, 2018, from corresponding U.S. Appl. No. 16/054,780.
Decision Regarding Institution of Post-Grant Review in Case PGR2018-00056 for U.S. Pat. No. 9,691,090 B1, dated Oct. 11, 2018.
International Search Report, dated Oct. 11, 2018, from corresponding International Application No. PCT/US2018/043975.
International Search Report, dated Oct. 11, 2018, from corresponding International Application No. PCT/US2018/043977.
International Search Report, dated Oct. 11, 2018, from corresponding International Application No. PCT/US2018/045240.
Notice of Allowance, dated Oct. 17, 2018, from corresponding U.S. Appl. No. 15/896,790.
Notice of Allowance, dated Oct. 17, 2018, from corresponding U.S. Appl. No. 16/054,672.
Restriction Requirement, dated Oct. 17, 2018, from corresponding U.S. Appl. No. 15/055,984.
Written Opinion of the International Searching Authority, dated Oct. 11, 2018, from corresponding International Application No. PCT/US2018/043975.
Written Opinion of the International Searching Authority, dated Oct. 11, 2018, from corresponding International Application No. PCT/US2018/043977.
Written Opinion of the International Searching Authority, dated Oct. 11, 2018, from corresponding International Application No. PCT/US2018/045240.
International Search Report, dated Oct. 11, 2018, from corresponding International Application No. PCT/US2018/043976.
Written Opinion of the International Searching Authority, dated Oct. 11, 2018, from corresponding International Application No. PCT/US2018/043976.
International Search Report, dated Oct. 16, 2018, from corresponding International Application No. PCT/US2018/045243.
Written Opinion of the International Searching Authority, dated Oct. 16, 2018, from corresponding International Application No. PCT/US2018/045243.
International Search Report, dated Oct. 11, 2018, from corresponding International Application No. PCT/US2018/044026.
Office Action, dated Oct. 23, 2018, from corresponding U.S. Appl. No. 16/055,961.
Written Opinion of the International Searching Authority, dated Oct. 11, 2018, from corresponding International Application No. PCT/US2018/044026.
International Search Report, dated Oct. 18, 2018, from corresponding International Application No. PCT/US2018/045249.
Written Opinion of the International Searching Authority, dated Oct. 18, 2018, from corresponding International Application No. PCT/US2018/045249.
International Search Report, dated Oct. 12, 2018, from corresponding International Application No. PCT/US2018/044046.
Office Action, dated Oct. 26, 2018, from corresponding U.S. Appl. No. 16/041,468.

(56) References Cited

OTHER PUBLICATIONS

Written Opinion of the International Searching Authority, dated Oct. 12, 2018, from corresponding International Application No. PCT/US2018/044046.
Invitation to Pay Additional Search Fees, dated Oct. 23, 2018, from corresponding International Application No. PCT/US2018/045296.
AvePoint, AvePoint Privacy Impact Assessment 1: User Guide, Cumulative Update 2, Revision E, Feb. 2015, AvePoint, Inc.
Enck, William, et al, TaintDroid: An Information-Flow Tracking System for Realtime Privacy Monitoring on Smartphones, ACM Transactions on Computer Systems, vol. 32, No. 2, Article 5, Jun. 2014, p. 5:1-5:29.
Final Office Action, dated Jan. 17, 2018, from corresponding U.S. Appl. No. 15/619,278.
Final Office Action, dated Jan. 23, 2018, from corresponding U.S. Appl. No. 15/619,479.
Final Office Action, dated Nov. 29, 2017, from corresponding U.S. Appl. No. 15/619,237.
Francis, Andre, Business Mathematics and Statistics, South-Western Cengage Learning, 2008, Sixth Edition.
Frikken, Keith B., et al, Yet Another Privacy Metric for Publishing Micro-data, Miami University, Oct. 27, 2008, p. 117-121.
Ghiglieri, Marco et al.; Personal DLP for Facebook, 2014 IEEE International Conference on Pervasive Computing and Communication Workshops (Percom Workshops); IEEE; Mar. 24, 2014; pp. 629-634.
Hunton & Williams LLP, The Role of Risk Management in Data Protection, Privacy Risk Framework and the Risk-Based Approach to Privacy, Centre for Information Policy Leadership, Workshop II, Nov. 23, 2014.
IAPP, Daily Dashboard, PIA Tool Stocked With New Templates for DPI, Infosec, International Association of Privacy Professionals, Apr. 22, 2014.
International Search Report, dated Aug. 15, 2017, from corresponding International Application No. PCT/US2017/036919.
International Search Report, dated Aug. 21, 2017, from corresponding International Application No. PCT/US2017/036914.
International Search Report, dated Aug. 29, 2017, from corresponding International Application No. PCT/US2017/036898.
International Search Report, dated Aug. 8, 2017, from corresponding International Application No. PCT/US2017/036889.
International Search Report, dated Aug. 8, 2017, from corresponding International Application No. PCT/US2017/036890.
International Search Report, dated Aug. 8, 2017, from corresponding International Application No. PCT/US2017/036893.
International Search Report, dated Aug. 8, 2017, from corresponding International Application No. PCT/US2017/036901.
International Search Report, dated Aug. 8, 2017, from corresponding International Application No. PCT/US2017/036913.
International Search Report, dated Aug. 8, 2017, from corresponding International Application No. PCT/US2017/036920.
International Search Report, dated Jun. 21, 2017, from corresponding International Application No. PCT/US2017/025600.
International Search Report, dated Jun. 6, 2017, from corresponding International Application No. PCT/US2017/025605.
International Search Report, dated Jun. 6, 2017, from corresponding International Application No. PCT/US2017/025611.
International Search Report, dated Oct. 12, 2017, from corresponding International Application No. PCT/US2017/036888.
International Search Report, dated Oct. 20, 2017, from corresponding International Application No. PCT/US2017/036917.
International Search Report, dated Oct. 3, 2017, from corresponding International Application No. PCT/US2017/036912.
International Search Report, dated Sep. 1, 2017, from corresponding International Application No. PCT/US2017/036896.
Invitation to Pay Additional Search Fees, dated Aug. 10, 2017, from corresponding International Application No. PCT/US2017/036912.
Invitation to Pay Additional Search Fees, dated Aug. 10, 2017, from corresponding International Appication No. PCT/US2017/036917.
Invitation to Pay Additional Search Fees, dated Aug. 24, 2017, from corresponding International Application No. PCT/US2017/036888.
Korba, Larry et al.; "Private Data Discovery for Privacy Compliance in Collaborative Environments"; Cooperative Design, Visualization, and Engineering; Springer Berlin Heidelberg; Sep. 21, 2008; pp. 142-150.
Li, Ninghui, et al, t-Closeness: Privacy Beyond k-Anonymity and I-Diversity, IEEE, 2014, p. 106-115.
Notice of Allowance, dated Apr. 12, 2017, from corresponding U.S. Appl. No. 15/256,419.
Notice of Allowance, dated Apr. 25, 2018, from corresponding U.S. Appl. No. 15/883,041.
Notice of Allowance, dated Aug. 14, 2018, from corresponding U.S. Appl. No. 15/989/416.
Notice of Allowance, dated Aug. 18, 2017, from corresponding U.S. Appl No. 15/619,455.
Notice of Allowance, dated Aug. 24, 2018, from corresponding U.S. Appl. No. 15/619,479.
Notice of Allowance, dated Aug. 30, 2018, from corresponding U.S. Appl. No. 15/996,208.
Notice of Allowance, dated Aug. 9, 2018, from corresponding U.S. Appl. No. 15/882,989.
Notice of Allowance, dated Dec. 12, 2017, from corresponding U.S. Appl. No. 15/169,643.
Notice of Allowance, dated Dec. 12, 2017, from corresponding U.S. Appl. No. 15/619,212.
Notice of Allowance, dated Dec. 12, 2017, from corresponding U.S. Appl. No. 15/619,382.
Notice of Allowance, dated Dec. 5, 2017, from corresponding U.S. Appl. No. 15/633,703.
Notice of Allowance, dated Dec. 6, 2017, from corresponding U.S. Appl. No. 15/619,451.
Notice of Allowance, dated Dec. 6, 2017, from corresponding U.S. Appl. No. 15/619,459.
Notice of Allowance, dated Jan. 18, 2018, from corresponding U.S. Appl No. 15/619,478.
Notice of Allowance, dated Jan. 23, 2018, from corresponding U.S. Appl. No. 15/619,251.
Notice of Allowance, dated Nov. 8, 2018, from corresponding U.S. Appl. No. 16/042,642.
Office Action, dated Nov. 15, 2018, from corresponding U.S. Appl. No. 16/059,911.
International Search Report, dated Nov. 19, 2018, from corresponding International Application No. PCT/US2018/046939.
Written Opinion of the International Searching Authority, dated Nov. 19, 2018, from corresponding International Application No. PCT/US2018/046939.
Office Action, dated Nov. 23, 2018, from corresponding U.S. Appl. No. 16/042,673.
Office Action, dated Dec. 3, 2018, from corresponding U.S. Appl. No. 16/055,998.
Byun, Ji-Won, Elisa Bertino, and Ninghui Li. "Purpose based access control of complex data for privacy protection." Proceedings of the tenth ACM symposium on Access control models and technologies. ACM, 2005. (Year: 2005).
Notice of Allowance, dated Dec. 10, 2018, from corresponding U.S. Appl. No. 16/105,602.
Office Action, dated Dec. 14, 2018, from corresponding U.S. Appl. No. 16/104,393.
International Search Report, dated Dec. 14, 2018, from corresponding International Application No. PCT/US2018/045296.
Notice of Allowance, dated Dec. 31, 2018, from corresponding U.S. Appl. No. 16/159,634.
Office Action, dated Dec. 31, 2018, from corresponding U.S. Appl. No. 16/160,577.
Restriction Requirement, dated Dec. 31, 2018, from corresponding U.S. Appl. No. 15/169,668.
Written Opinion of the International Searching Authority, dated Dec. 14, 2018, from corresponding International Application No. PCT/US2018/045296.
Antunes et al, "Preserving Digital Data in Heterogeneous Environments", ACM, pp. 345-348, 2009 (Year: 2009).

(56) References Cited

OTHER PUBLICATIONS

Huner et al, "Towards a Maturity Model for Corporate Data Quality Management", ACM, pp. 231-238, 2009 (Year: 2009).
Newman, "Email Archive Overviews using Subject Indexes", ACM, pp. 652-653, 2002 (Year: 2002).
Office Action, dated Jan. 4, 2019, from corresponding U.S. Appl. No. 16/159,566.
Office Action, dated Jan. 4, 2019, from corresponding U.S. Appl. No. 16/159,628.
Weaver et al, "Understanding Information Preview in Mobile Email Processing", ACM, pp. 303-312, 2011 (Year: 2011).
International Search Report, dated Jan. 7, 2019, from corresponding International Application No. PCT/US2018/055772.
Written Opinion of the International Searching Authority, dated Jan. 7, 2019, from corresponding International Application No. PCT/US2018/055772.
Office Action, dated Jan. 18, 2019, from corresponding U.S. Appl. No. 16/055,984.
Notice of Allowance, dated Jan. 18, 2019 from corresponding U.S. Appl. No. 16/159,635.
International Search Report, dated Jan. 14, 2019, from corresponding International Application No. PCT/US2018/046949.
Written Opinion of the International Searching Authority, dated Jan. 14, 2019, from corresponding International Application No. PCT/US2018/046949.

\* cited by examiner

Verify Your Identity

Name: Joe Lopez

To verify your identity, please answer the following questions.
• Which of the following STREETS have you NEVER lived or used as your address?
○
○
○
○ ALL OF THE ABOVE
• With which of the following PEOPLE are you most closely associated?
○
○
○
○ NONE OF THE ABOVE
• Which of the following CITIES have you PREVIOUSLY OR CURRENTLY used as your address?
○
○
○
○ NONE OF THE ABOVE

ACME CORPORATION

I am a(n): *Select One*
[ Customer ]  [ Employee ]  [ Other ]

My request involves: *Select One*
[ Requesting Info ]  [ Deleting Data ]  [ Filing a Complain ]
[ Opting Out ]  [ Updating Data ]  [ Other ]

First Name*:
Joe

Last Name*:
Lopez

Email Address*:
Jlopez123456789@gmail.com

Telephone:
1234567890

Addr Line 1:
123 Main St.

Addr Line 2:
Box 502

City:
Madrid

Country of Residence:
Spain

Details of my request:
Send me my Data

[ Submit ]

ACME Privacy
123 Main St.
Capital City, ST, USA 20219

+1 800-123-4578
emailaboutprivacy@ACME.com
Link to Privacy Policy

FIG. 15

ACME CORPORATION

I am a(n):   Select One

[ Customer ]   [ Employee ]   [ Other ]

Thank you! A confirmation of your submission has been sent to the following email: Jlopez123456789@gmail.com

Your Request ID is: 5

OK

First Name*:
Joe

Last Name*:
Lopez

Email Address*:                              Telephone:
Jlopez123456789@gmail.com                    1234567890

Addr Line 1:                                 Addr Line 2:
123 Main St.                                 Box 502

City:
Madrid

Country of Residence*:
Spain

Details of my request:
Send me my Data

ACME Privacy
123 Main St.
Capital City, ST, USA 20219

+1 800-123-4578
emailaboutprivacy@ACME.com
Link to Privacy Policy

FIG. 16

From: OneTrust Privacy Officer
Sent: Sunday, February 19, 2017 9:27 PM EST
To: Joe Lopez <jlopez123456789@gmail.com>
BCc: Amelia Davis <adavis09876@ACME.com>
Subject: *Your ACME Privacy Request is being processed*

Data Request

Thank you for your submission! Here are the details of your request:

Request ID: 5
Date Submitted: 2/21/2017 10:35AM EST
I am a(n): Customer
My request involves: Opting Out
First Name*: Joe
Last Name*: Lopez
Email Address*: Jlopez123456789@gmail.com
Telephone: XXXXXX986
Addr Line 1: XXXXXXXXXX
Addr Line 2: XXXXXXXXXX
City: XXXXXXXXXX
Count of Residence*: XXXXXXXXXX
Details of my request:
Send me my Data If you have any questions regarding your submission, please contact *Amelia Davis* via email or phone:
adavis09876@ACME.com
+00 123 123 9980

ACME Privacy
123 Main St.
Capital City, ST, USA 20219

+1 800-123-4578
emailaboutprivacy@ACME.com
Link to Privacy Policy

FIG. 17

Data Subject Request Queue

*Enter Name* 🔍                                   ( New Request )   ( Edit ⌄ )   ( Filter )

| ☐ | ID ⌄ | Name | Status ⌄ | Purpose | Days Left to Respond | Extension | Date Created | DSR Type | Respondent | |
|---|------|------|----------|---------|----------------------|-----------|--------------|----------|------------|---|
| ☐ | 012 | Donald Blair | ( New ) | Retrieve | 30 | NO | 11/02/17 | Employee | Rena Doyle | ⌃ |
| ☐ | 012 | Donald Blair | ( New ) | Retrieve | 30 | NO | 11/02/17 | Employee | Rena Doyle | ⌃ |
| ☐ | 012 | Allison Smith | ( New ) | Retrieve | 30 | NO | 11/02/17 | Employee | Rena Doyle | ⌃ |
| ☐ | 012 | Donald Blair | ( Complete ) | Retrieve | 30 | NO | 11/02/17 | Employee | Rena Doyle | ⌃ |

FIG. 18

Data Subject Request Queue

| | ID ▼ | Name | Status ▼ | Purpose | Days Left to Respond | Extension | Date | ndent | |
|---|---|---|---|---|---|---|---|---|---|
| ☐ | 012 | Donald Blair | New | Retrieve | 30 | NO | | a Doyle | ∧ |
| ☑ | 012 | Donald Blair | New | Retrieve | 30 | NO | | a Doyle | ∧ |
| ☐ | 012 | Allison Smith | New | Retrieve | 30 | NO | 11/02/17 | Employee Rena Doyle | ∧ |
| ☐ | 012 | Donald Blair | Complete | Retrieve | 30 | NO | 11/02/17 | Employee Rena Doyle | ∧ |

Popup menu:
- Verify Request
- Assign
- Request Extension
- Reject
- Suspend

Top controls: Enter Name | New Request | Edit | Filter

FIG. 19

Data Subject Request Queue

| | ID ▽ | Name | Status ▽ | Purpose | Days Left to Respond | Date Created | Extension | DSR Type | Respondent | |
|---|---|---|---|---|---|---|---|---|---|---|
| ☐ | 012 | Donald Blair | New | Retrieve | 30 | 11/02/17 | No | Employee | Rena Doyle | ⋁ |
| ☑ | 012 | Donald Blair | | | | | | mployee | Rena Doyle | ⋁ |
| ☐ | 012 | Allison Smith | | | | | | mployee | Rena Doyle | ⋁ |
| ☐ | 012 | Donald Blair | | | | | | mployee | Rena Doyle | ⋁ |

Authentication ✕

Are you sure you want to Authenticate?
Donald Blair

*Enter reason for rejecting request here*

⬆ Upload Attachment

Cancel    Submit

FIG. 20

Data Subject Request Queue

*Enter Name* 🔍  (New Request)  (Edit)  (Filter)

| | ID ⌄ | Name | Status ⌄ | Purpose | Days Left to Respond | Extension | Date Created | DSR Type | Respondent | |
|---|---|---|---|---|---|---|---|---|---|---|
| ☐ | 012 | Donald Blair | (New) | Retrieve | 30 | NO | 11/02/17 | Employee | Rena Doyle | ⌄ |
| ☑ | 012 | Donald Blair | | | | | | mployee | Rena Doyle | ⌄ |
| ☐ | 012 | Allison Smith | | | | | | mployee | Rena Doyle | ⌄ |
| ☐ | 012 | Donald Blair | | | | | | mployee | Rena Doyle | ⌄ |

Authentication ✕

Are you sure you want to Authenticate?
Donald Blair

Duis mollis, est non commodo luctus, niosi eratnporftitor liguia,eget lacinia odio sem nec elit. Aenean lacinia bibendum nulla sed consectectur .Lorem ipsum dolor sit amet, consectectur adipiscing elit. ✕

📎 Upload Attachment   datasubject_doc.pdf (Cancel)  (Submit)

FIG. 21

Data Subject Request Queue

| | ID ▽ | Name | Status ▽ | Purpose | Days Left to Respond | Extension | Date Created | DSR Type | Respondent | |
|---|---|---|---|---|---|---|---|---|---|---|
| ☐ | 012 | Tim LePenne | New | Retrieve | 30 | NO | 11/02/17 | Employee | Rena Doyle | ∧ |
| ☐ | 012 | Donald Blair | In progress | Retrieve | 30 | NO | 11/02/17 | Employee | Rena Doyle | ∧ |
| ☐ | 012 | Allison Smith | New | Retrieve | 30 | NO | 11/02/17 | Employee | Rena Doyle | ∧ |
| ☐ | 012 | Franklin Howard | Complete | Retrieve | 30 | NO | 11/02/17 | Employee | Rena Doyle | ∧ |

FIG. 22

Data Subject Request Queue

| ID ▽ | Name | Status ▽ | Purpose | Days Left to Respond | Extension | Date | |
|---|---|---|---|---|---|---|---|
| 012 | Tim LePenne | New | Retrieve | 30 | NO | | Doyle |
| 012 | Donald Blair | In progress | Retrieve | 30 | NO | | Doyle |
| 012 | Allison Smith | In progress | Retrieve | 30 | NO | 11/02/17 | Employee Rena Doyle |
| 012 | Franklin Howard | Complete | Retrieve | 30 | NO | 11/02/17 | Employee Rena Doyle |

Verify Request
Assign
Request Extension
Reject
Suspend

Data Subject Request Queue

| | ID ▼ | Name | Status ▼ | Purpose | Days Left to Respond | Extension | Date | ondent |
|---|---|---|---|---|---|---|---|---|
| ☐ | 012 | Tim LePenne | New | Retrieve | 30 | NO | | |
| ☑ | 012 | Donald Blair | In progress | Retrieve | 30 | NO | 1 | Doyle |
| ☐ | 012 | Allison Smith | In progress | Retrieve | 30 | NO | 11/02/17 | Employee Rena Doyle |
| ☐ | 012 | Franklin Howard | Complete | Retrieve | 30 | NO | 11/02/17 | Employee Rena Doyle |

Verify Request
Assign
Request Extension
Reject
Suspend

FIG. 26

Data Subject Request Queue

| | ID ▼ | Name | Status ▼ | Purpose | Days Left to Respond | Extension | Date Created | DSR Type | Respondent |
|---|---|---|---|---|---|---|---|---|---|
| ☐ | 012 | Tim LePenne | New | Retrieve | 30 | NO | 11/02/17 | Employee | Rena Doyle ∨ |
| ☑ | 012 | Donald Blair | In progress | Retrieve | 30 | NO | 11/02/17 | Employee | Rena Doyle ∨ |
| ☐ | 012 | Allison Smith | In progress | Retrieve | 30 | NO | 11/02/17 | Employee | Rena Doyle ∨ |
| ☐ | 012 | Franklin Howard | | | | | | Employee | Rena Doyle ∨ |

New Request  Edit  OK  OK

Reject request  ✕

Enter reason for rejecting request here

Cancel  Submit

FIG. 27

Data Subject Request Queue

| | ID ▼ | Name | Status ▼ | Purpose | Days Left to Respond | Extension | Date Created | DSR Type | Respondent | |
|---|---|---|---|---|---|---|---|---|---|---|
| ☐ | 012 | Tim LePenne | New | Retrieve | 30 | NO | 11/02/17 | Employee | Rena Doyle | ∨ |
| ☑ | 012 | Donald Blair | In progress | Retrieve | 30 | NO | 11/02/17 | Employee | Rena Doyle | ∨ |
| ☐ | 012 | Allison Smith | In progress | Retrieve | 30 | NO | 11/02/17 | Employee | Rena Doyle | ∨ |
| ☐ | 012 | Franklin Howard | | | | | | Employee | Rena Doyle | ∨ |

Reject Request ✕

The request submitted cannot be collected as no data regarding the Data Subject is maintained by mycompany any longer Cancel   Submit

FIG. 28

Data Subject Request Queue

| | ID ▼ | Name | Status ▼ | Purpose | Days Left to Respond | Extension | Date Created | DSR Type | Respondent | |
|---|---|---|---|---|---|---|---|---|---|---|
| ☐ | 012 | Tim LePenne | New | Retrieve | 30 | NO | 11/02/17 | Employee | Rena Doyle | ∧ |
| ☑ | 012 | Donald Blair | Rejected | Retrieve | 30 | NO | 11/02/17 | Employee | Rena Doyle | ∧ |
| ☐ | 012 | Allison Smith | In progress | Retrieve | 30 | NO | 11/02/17 | Employee | Rena Doyle | ∧ |
| ☐ | 012 | Franklin Howard | Complete | Retrieve | 30 | NO | 11/02/17 | Employee | Rena Doyle | ∧ |

FIG. 29

From: OneTrust Privacy Officer
Sent: Sunday, February 19, 2017 9:27 PM EST
To: Allison Smith <asmith123456789@gmail.com>
Bcc: Amelia Davis <adavis09876@ACME.com>
Subject: *Your ACME Privacy Request is being Completed*

Data Response

Dear Allison,

The request submitted cannot be collected as no data regarding the Data Subject is maintained by *mycompany* any longer Here are the details of your request:

Request ID: 5
Date Submitted: 2/21/2017 10:35AM EST
I am a(n): Employee
My request involves: Restrict
**First Name*:** Allison
**Last Name*:** Smith
**Email Address*:** asmith123456789@gmail.com
Telephone: XXXXXXXXX
Addr Line 1: XXXXXXXXXX
Addr Line 2: XXXXXXXXXX
City: XXXXXXXXXX
**Count of Residence*:** XXXXXXXXXX
Details of my request:
Restrict my Data If you have any questions regarding your submission, please contact *Amelia Davis* via email or phone:
adavis09876@ACME.com
+00 123 123 9980

ACME Privacy
123 Main St.
Capital City, ST, USA 20219

+1 800-123-4578
emailaboutprivacy@ACME.com
Link to Privacy Policy

FIG. 30

Data Subject Request Queue

| | ID ▼ | Name | Status ▼ | Purpose | Days Left to Respond | Extension | Date | |
|---|---|---|---|---|---|---|---|---|
| ☐ | 012 | Tim LePenne | New | Retrieve | 30 | NO | | ndent ⌄ |
| ☐ | 012 | Donald Blair | In progress | Retrieve | 2 | NO | 1 | Doyle ⌄ |
| ☐ | 012 | Allison Smith | In progress | Retrieve | 30 | NO | 11/02/17 Employee | Rena Doyle ⌄ |
| ☐ | 012 | Franklin Howard | Complete | Retrieve | 30 | NO | 11/02/17 Employee | Rena Doyle ⌄ |

Verify Request
Assign
Request Extension
Reject
Suspend

New Request | Edit ⌄ | Filter

Data Subject Request Queue

| | ID ▼ | Name | Status ▼ | Purpose | Days Left to Respond | Extension | Date Created | DSR Type | Respondent | |
|---|---|---|---|---|---|---|---|---|---|---|
| ☐ | 012 | Tim LePenne | New | Retrieve | 30 | NO | 11/02/17 | Employee | Rena Doyle | ∧ |
| ☐ | 012 | Donald Blair | New | Retrieve | 92 | YES | 11/02/17 | Employee | Rena Doyle | ∧ |
| ☐ | 012 | Allison Smith | In progress | Retrieve | 30 | NO | 11/02/17 | Employee | Rena Doyle | ∧ |
| ☐ | 012 | Franklin Howard | Complete | Retrieve | 30 | NO | 11/02/17 | Employee | Rena Doyle | ∧ |

FIG. 33

Data Subject Request Queue

| | ID ▽ | Name | Status ▽ | Purpose | Days Left to Respond | Extension | Date Created | DSR Type | Respondent | |
|---|---|---|---|---|---|---|---|---|---|---|
| ☐ | 012 | Tim LePenne | New | Retrieve | 30 | NO | 11/02/17 | Employee | Rena Doyle | > |
| ☐ | 012 | Donald Blair | In progress | Retrieve | 30 | NO | 11/02/17 | Employee | Rena Doyle | > |
| ☐ | 012 | Allison Smith | Rejected | Retrieve | 30 | NO | 11/02/17 | Employee | Rena Doyle | > |
| ☐ | 012 | Franklin Howard | Complete | Retrieve | 30 | NO | 11/02/17 | Employee | Rena Doyle | > |

Data Subject Request Details (In progress)

Request Queue > Response-05

Assignee: Jason Sabourin
Date Opened: 11/02/17
Extended: No
Deadline: 3/25
Request Type: Data Retrieval
Request Count: 1
Tags: + Add New

Donald Blair

Request ID: 05
e-mail address: dblair@gmail.com
Address: 123 Main St, Apt 18, Atlanta, Ga 30320
Country: USA
Phone number: 323-420-4039
Subject Type: Customer

Inbox | Comments | Attachments

Today

From: Donald Blair
03/09/17 09:33 AM EST

Cras mattis consectetur purus sit amet fermentum. Cras justo odio, dapibus ac facilisis in, egestas eget quam. Nullam quis risus eget urna mollis ornare vel eu leo. Maecenas faucibus mollis interdum. Curabitur blandit tempus porttitor.

Draft to Donald Blair
CC: *Enter CC Here*

Cras mattis consectetur purus sit amet fermentum. Cras justo odio, dapibus ac facilisis in, egestas eget quam. Nullam quis risus eget urna mollis ornare vel eu leo. Maecenas faucibus mollis interdum. Curabitur blandit tempus porttitor.

Save | Send as Complete

From: OneTrust
03/09/17 09:33 AM EST
CC: Jason Sabourin, Brett Curtis

Edit

FIG. 39

< Back to Queue

Data Subject Request Details (Complete)
Request Queue > Response-05                                    Edit

Assignee:
Jason Sabourin

Date Opened:
11/02/17

Extended:
No

Deadline:
3/25

Request Type:
Data Retrieval

Request Count:
1

Tags:
( + Add New )

Donald Blair

Request ID:      05                          Country:        USA
e-mail address: dblair@gmail.com             Phone number:   323-420-4039
Address:        123 Main St                  Subject Type:   Customer
                Apt 18
                Atlanta, Ga 30320

| Inbox | Comments | Attachments |

Today

> From: OneTrust       ( Replied as Complete )
> 03/09/17  09:33 AM EST
> CC: Jason Sabourin, Brett Curtis > From: Donald Blair
> 03/09/17  09:33 AM EST

Monday

> From: OneTrust
> 03/09/17  09:33 AM EST
> CC: Jason Sabourin, Brett Curtis

FIG. 40

From: OneTrust Privacy Officer
Sent: Sunday, February 19, 2017 9:27 PM EST
To: Joe Lopez <jlopez123456789@gmail.com>
Bcc: Amelia Davis <adavis09876@ACME.com>
Subject: Your ACME Privacy Request is Completed

Data Response

Dear Joe,

Your privacy-related request has been completed. In order to access the data you requested, please click the secure link below.

http://www.securelink.onetrust.com/1124ahawiu091284

If you have any questions regarding your submission, please contact *Amelia Davis* via email or phone:
adavis09876@ACME.com
+00 123 123 9980

Here are the details of your request:

Request ID: 5
Date Submitted: 2/21/2017 10:35AM EST
I am a(n): Customer
My request involves: Opting Out
First Name\*: Joe
Last Name\*: Lopez
Email Address\*: Jlopez123456789@gmail.com
Telephone: XXXXXXXXX
Addr Line 1: XXXXXXXXXX
Addr Line 2: XXXXXXXXXX
City: XXXXXXXXXX
Count of Residence\*: XXXXXXXXXX
Details of my request:
Send me my Data If you have any questions regarding your submission, please contact *Amelia Davis* via email or phone:
adavis09876@ACME.com
+00 123 123 9980

ACME Privacy
123 Main St.
Capital City, ST, USA 20219

+1 800-123-4578
emailaboutprivacy@ACME.com
Link to Privacy Policy

FIG. 41

From: OneTrust Privacy Officer
Sent: Sunday, February 19, 2017 9:27 PM EST
To: Joe Lopez <jlopez123456789@gmail.com>
Bcc: Amelia Davis <adavis09876@ACME.com>
Subject: *Your ACME Privacy Request is being Completed*

ACME CORPORATION

Auth Token

TOKEN: ABSH!&&@12131JEJE

ACME Privacy
123 Main St.
Capital City, ST, USA 20219

+1 800-123-4578
emailaboutprivacy@ACME.com
Link to Privacy Policy

OneTrust
Privacy Management Software

Request ID

5

Email Token

ABSHI&&@12131JEJE

Log In

Welcome to OneTrust

Features:
- Unlimited usage and respondents
- Centralized record keeping and reporting
- Readiness & PIA Templates
- Data Mapping Automation
- Website Scanning & Cookie Compliance
- Ability to tailor questionnaire templates for use cases including: GDPR, DPIA, Privacy Threshold assessment (PTA), Vendor Risk Assessments, Information Security Assessments, and more Questions? Contact Us support@onetrust.com

FIG. 44

Data Subject Requests Queue

| ID | Name | Status | Request Type | Days Lef.. | Extended | Date Created | Subject Type | Reviewer | |
|---|---|---|---|---|---|---|---|---|---|
| 5 | Jason Sabourin | IN PROGRESS | Data Deletion, Opt Out | 30 | No | Today at 11:43 AM | Employee | Mihir Karanjkar | ... |

Email
js@email.com

Country
United Kingdom

Request Details
Please delete personal data

Review Comments
Mihir Karanjkar Today at 11:43 AM
Currently reviewing request

| | | | | | | | | | |
|---|---|---|---|---|---|---|---|---|---|
| 4 | Mihir Karanjkar | IN PROGRESS | Data Deletion | 30 | No | Today at 9:59 AM | Employee | Mihir Karanjkar | ... |
| 3 | Mihir Karanjkar | COMPLETE | Data Deletion | 26 | No | Last Thursday at 2:08 PM | Employee | Mihir Karanjkar | ... |
| 2 | Achint Sehgal | IN PROGRESS | Update Data | 26 | No | Last Wednesday at 4:46 PM | Customer | Mihir Karanjkar | ... |
| 1 | John Smith | NEW | Info Request | 25 | No | Last Wednesday at 2:28 PM | Customer | Mihir Karanjkar | ... |

FIG. 47

Data Subject Request Queue

| | ID ▽ | Name | Prioritization ▽ | Purpose | Days Left to Respond | Extension | Date Created | DSR Type | Respondent | |
|---|---|---|---|---|---|---|---|---|---|---|
| ☐ | 012 | Tim LePenne | Normal | Retrieve | 30 | NO | 11/02/17 | Employee | Rena Doyle | ∧ |
| ☐ | 012 | Donald Blair | Normal | Retrieve | 30 | NO | 11/02/17 | Employee | Rena Doyle | ∧ |
| ☐ | 012 | Allison Smith | URGENT | Retrieve | 30 | NO | 11/02/17 | Employee | Rena Doyle | ∧ |
| ☐ | 012 | Franklin Howard | Low | Retrieve | 30 | NO | 11/02/17 | Employee | Rena Doyle | ∧ |

FIG. 51

DATA PROCESSING SYSTEMS FOR PRIORITIZING DATA SUBJECT ACCESS REQUESTS FOR FULFILLMENT AND RELATED METHODS

CROSS REFERENCE TO RELATED APPLICATIONS

This application is a continuation-in-part of U.S. patent application Ser. No. 15/996,208, filed Jun. 1, 2018, which claims priority from U.S. Provisional Patent Application Ser. No. 62/537,839 filed Jul. 27, 2017, and is also a continuation-in-part of U.S. patent application Ser. No. 15/853,674, filed Dec. 22, 2017, which claims priority from U.S. Provisional Patent Application Ser. No. 62/541,613, filed Aug. 4, 2017, and is also a continuation-in-part of U.S. patent application Ser. No. 15/619,455, filed Jun. 10, 2017, which is a continuation-in-part of Ser. No. 15/254,901, filed Sep. 1, 2016; which claims priority from: (1) U.S. Provisional Patent Application Ser. No. 62/360,123, filed Jul. 8, 2016; (2) U.S. Provisional Patent Application Ser. No. 62/353,802, filed Jun. 23, 2016; (3) U.S. Provisional Patent Application Ser. No. 62/348,695, filed Jun. 10, 2016; this application also claims priority from U.S. Provisional Patent Application Ser. No. 62/547,530, filed Aug. 18, 2017. The disclosures of all of the above patent applications are hereby incorporated herein by reference in their entirety.

BACKGROUND

Over the past years, privacy and security policies, and related operations have become increasingly important. Breaches in security, leading to the unauthorized access of personal data (which may include sensitive personal data) have become more frequent among companies and other organizations of all sizes. Such personal data may include, but is not limited to, personally identifiable information (PII), which may be information that directly (or indirectly) identifies an individual or entity. Examples of PII include names, addresses, dates of birth, social security numbers, and biometric identifiers such as a person's fingerprints or picture. Other personal data may include, for example, customers' Internet browsing habits, purchase history, or even their preferences (e.g., likes and dislikes, as provided or obtained through social media).

Many organizations that obtain, use, and transfer personal data, including sensitive personal data, have begun to address these privacy and security issues. To manage personal data, many companies have attempted to implement operational policies and processes that comply with legal and industry requirements. However, there is an increasing need for improved systems and methods to manage personal data in a manner that complies with such policies.

SUMMARY

A computer-implemented method for prioritizing data subject access requests, according to particular embodiments, comprises: (1) receiving, by one or more processors, a data subject access request from a requestor comprising one or more request parameters; (2) applying, by one or more processors, a prioritization level to the received data subject access request; (3) at least partially in response to receiving the data subject access request, obtaining, by one or more processors, one or more pieces of metadata associated with a data subject of the data subject access request; (4) determining, by one or more processors, whether the one or more pieces of metadata relate to a priority of fulfilling the data subject access request; (5) in response to determining that the obtained one or more pieces of metadata relate to the priority of fulfilling the data subject access request, analyzing, by one or more processors, the one or more pieces of obtained metadata to determine whether the prioritization level of the data subject access request should be adjusted; (6) in response to determining that the prioritization level of the data subject access request should be adjusted based on the obtained one or more pieces of metadata, adjusting, by one or more processors, the prioritization level of the data subject access request for fulfillment of the data subject access request; and (7) digitally storing, by one or more processors, the adjusted prioritization level of the data subject access request in computer memory.

A computer-implemented method for prioritizing data subject access requests, in any embodiment described herein comprises: (1) receiving, by one or more processors, a data subject access request from a requestor; (2) at least partially in response to receiving the data subject access request, obtaining, by one or more processors, one or more pieces of metadata associated with a data subject of the data subject access request, wherein the metadata is selected from a group consisting of: (A) a request type associated with the data subject access request; (B) a location from which the data subject access request is being made; (C) current sensitivities to world events; (D) a status of the requestor issuing the data subject access request; and (E) a time in which the data subject access request was made; (3) analyzing, by one or more processors, the one or more pieces of obtained metadata to determine a prioritization level of the data subject access request; (4) determining, by one or more processors, the prioritization level of the data subject access request based at least in part on the one or more pieces of obtained metadata; and (5) digitally storing, by one or more processors, the prioritization level of the data subject access request in computer memory.

A computer-implemented method for prioritizing data subject access requests, according to various embodiments, comprises: (1) receiving, by one or more processors, a data subject access request from a requestor; (2) validating, by one or more processors, an identity of the requestor by prompting the requestor to identify information associated with the requestor; (3) at least partially in response to receiving the data subject access request, obtaining, by one or more processors, one or more pieces of metadata associated with a data subject of the data subject access request; (4) analyzing, by one or more processors, the one or more pieces of obtained metadata to determine a prioritization level of the data subject access request; (5) determining, by one or more processors, the prioritization level of the data subject access request based at least in part on the one or more pieces of obtained metadata; and (6) digitally storing, by one or more processors, the prioritization level of the data subject access request in computer memory.

BRIEF DESCRIPTION OF THE DRAWINGS

Various embodiments of a data subject access request prioritization system are described below. In the course of this description, reference will be made to the accompanying drawings, which are not necessarily drawn to scale, and wherein:

FIGS. 1-6 depict various exemplary screen displays and user interfaces that a user of various embodiments of the system may encounter.

FIGS. 9-49 are computer screen shots that demonstrate the operation of various embodiments.

FIG. 51 depicts an exemplary screen display of a data subject request queue that may be presented to indicate a prioritization of fulfilling data subject access requests.

DETAILED DESCRIPTION

Figure 1:

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

In various embodiments, an organization, corporation, etc. may be required to provide information requested by an individual for whom the organization stores personal data. As a particular example, an organization may be required to provide an individual with a listing of, for example: (1) any personal data that the organization is processing for an individual, (2) an explanation of the categories of data being processed and the purpose of such processing; (3) categories of third parties to whom the data may be disclosed; (4) etc. In particular embodiments, the system may prioritize the processing of data subject access requests based on metadata related to the data subject access request.

In various embodiments, a data subject access request prioritization system may be implemented in the context of any suitable privacy management system that is configured to ensure compliance with one or more legal or industry standards related to the collection and/or storage of private information (e.g., such as personal data). In any embodiment described herein, personal data may include, for example: (1) the name of a particular data subject (which may be a particular individual); (2) the data subject's address; (3) the data subject's telephone number; (4) the data subject's e-mail address; (5) the data subject's social security number; (6) information associated with one or more of the data subject's credit accounts (e.g., credit card numbers); (7) banking information for the data subject; (8) location data for the data subject (e.g., their present or past location); (9) internet search history for the data subject; and/or (10) any other suitable personal information, such as other personal information discussed herein. In particular embodiments, such personal data may include one or more cookies (e.g., where the individual is directly identifiable or may be identifiable based at least in part on information stored in the one or more cookies).

Various privacy and security policies (e.g., such as the European Union's General Data Protection Regulation, and other such policies) may provide data subjects (e.g., individuals, organizations, or other entities) with certain rights related to the data subject's personal data that is collected, stored, or otherwise processed by an organization. These rights may include, for example: (1) a right to obtain confirmation of whether a particular organization is processing their personal data; (2) a right to obtain information about the purpose of the processing (e.g., one or more reasons for which the personal data was collected); (3) a right to obtain information about one or more categories of data being processed (e.g., what type of personal data is being collected, stored, etc.); (4) a right to obtain information about one or more categories of recipients with whom their personal data may be shared (e.g., both internally within the organization or externally); (5) a right to obtain information about a time period for which their personal data will be stored (e.g., or one or more criteria used to determine that time period); (6) a right to obtain a copy of any personal data being processed (e.g., a right to receive a copy of their personal data in a commonly used, machine-readable format); (7) a right to request erasure (e.g., the right to be forgotten), rectification (e.g., correction or deletion of inaccurate data), or restriction of processing of their personal data; and (8) any other suitable rights related to the collection, storage, and/or processing of their personal data (e.g., which may be provided by law, policy, industry or organizational practice, etc.). These rights may be asserted or requested by a data subject as a data subject access request.

As may be understood in light of this disclosure, a particular organization may undertake a plurality of different privacy campaigns, processing activities, etc. that involve the collection and storage of personal data. In some embodiments, each of the plurality of different processing activities may collect redundant data (e.g., may collect the same personal data for a particular individual more than once), and may store data and/or redundant data in one or more particular locations (e.g., on one or more different servers, in one or more different databases, etc.). In this way, a particular organization may store personal data in a plurality of different locations which may include one or more known and/or unknown locations. As such, complying with particular privacy and security policies related to personal data (e.g., such as responding to one or more requests by data subjects related to their personal data) may be particularly difficult (e.g., in terms of cost, time, etc.). In particular embodiments, the data subject access request fulfillment system may utilize one or more data model generation and population techniques to create a centralized data map with which the system can identify personal data stored, collected, or processed for a particular data subject, a reason for the processing, and any other information related to the processing.

In particular embodiments, the data subject access request fulfillment system is configured to: (1) receive a data subject access request from a data subject, the data subject access request comprising one or more requests related to the one or more rights described above (e.g., a request for a copy of the data subject's personal data, a request regarding how long personal data associated with the data subject is being stored by the system, etc.); (2) process the request; and (3) fulfill the request based at least in part on one or more request parameters.

Figure 2:

FIGS. 1-2 depict exemplary screen displays that a user may view when submitting a data subject access request (e.g., exemplary user interfaces for submitting a data subject access request). As shown in FIG. 1, a website associated with a particular organization may include a user-selectable indicia for submitting a privacy-related request. A user desiring to make such a request may select the indicia in order to initiate the data subject access request process.

FIG. 2 depicts an exemplary data subject access request form in both an unfilled and filled out state. As shown in this figure, the system may prompt a user to provide information such as, for example: (1) what type of requestor the user is (e.g., employee, customer, etc.); (2) what the request involves (e.g., requesting info, opting out, deleting data, updating data, etc.); (3) first name; (4) last name; (5) email address; (6) telephone number; (7) home address; (8) one or more other pieces of identifying information; and/or (9) one or more details associated with the request. As will be discussed more fully below, the system may be configured to utilize one or more pieces of information provided by the data subject when processing and fulfilling the data subject access request. This information may, for example, serve as metadata that the system uses in prioritizing such requests.

Various embodiments of a data subject access request prioritization system are described more fully below.

Automatic Identity Validation Systems

In particular embodiments, when processing a data subject access request, the system may be configured to verify an identity of the data subject prior to processing the request (e.g., or as part of the processing step). In various embodiments, confirming the identity of the data subject may, for example, limit a risk that a third-party or other entity may gain unlawful or unconsented to access to the requestor's personal data. The system may, for example, limit processing and fulfillment of requests relating to a particular data subject to requests that are originated by (e.g., received from) the particular data subject. When processing a data subject access request, the system may be configured to use all reasonable measures to verify the identity of the data subject who requests access (e.g., in particular in the context of online services and online identifiers). In particular embodiments, the system is configured to substantially automatically validate an identity of a data subject when processing the data subject access request.

For example, in particular embodiments, the system may be configured to substantially automatically (e.g., automatically) authenticate and/or validate an identity of a data subject using any suitable technique. These techniques may include, for example: (1) one or more credit-based and/or public- or private-information-based verification techniques; (2) one or more company verification techniques (e.g., in the case of a business-to-business data subject access request); (3) one or more techniques involving integration with a company's employee authentication system; (4) one or more techniques involving a company's (e.g., organization's) consumer portal authentication process; (5) etc. Various exemplary techniques for authenticating a data subject are discussed more fully below.

In particular embodiments, when authenticating a data subject (e.g., validating the data subject's identity), the system may be configured to execute particular identity confirmation steps, for example, by interfacing with one or more external systems (e.g., one or more third-party data aggregation systems). For example, the system, when validating a data subject's identity, may begin by verifying that a person with the data subject's name, address, social security number, or other identifying characteristic (e.g., which may have been provided by the data subject as part of the data subject access request) actually exists. In various embodiments, the system is configured to interface with (e.g., transmit a search request to) one or more credit reporting agencies (e.g., Experian, Equifax, TransUnion, etc.) to confirm that a person with one or more characteristics provided by the data subject exists. The system may, for example, interface with such credit reporting agencies via a suitable plugin (e.g., software plugin). Additionally, there might be a verification on behalf of a trusted third-party system (e.g., the controller).

In still other embodiments, the system may be configured to utilize one or more other third-party systems (e.g., such as LexisNexis, IDology, RSA, etc.), which may, for example, compile utility and phone bill data, property deeds, rental agreement data, and other public records for various individuals. The system may be configured to interface with one or more such third-party systems to confirm that a person with one or more characteristics provided by the data subject exists.

After the step of confirming the existence of a person with the one or more characteristics provided by the data subject, the system may be configured to confirm that the person making the data subject access request is, in fact, the data subject. The system may, for example, verify that the requestor is the data subject by prompting the requestor to answer one or more knowledge-based authentication questions (e.g., out-of-wallet questions). In particular embodiments, the system is configured to utilize one or more third-party services as a source of such questions (e.g., any of the suitable third-party sources discussed immediately above). The system may use third-party data from the one or more third-party sources to generate one or more questions. These one or more questions may include questions that a data subject should know an answer to without knowing the question ahead of time (e.g., one or more previous addresses, a parent or spouse name and/or maiden name, etc.).

FIG. 3 depicts an exemplary identity verification questionnaire. As may be understood from this figure, an identity verification questionnaire may include one or more questions whose responses include data that the system may derive from one or more credit agencies or other third-party data aggregation services (e.g., such as previous street addresses, close associates, previous cities lived in, etc.). In particular embodiments, the system is configured to provide these one or more questions to the data subject in response to receiving the data subject access request. In other embodiments, the system is configured to prompt the data subject to provide responses to the one or more questions at a later time (e.g., during processing of the request). In particular other embodiments, the system is configured to substantially automatically compare one or more pieces of information provided as part of the data subject access request to one or more pieces of data received from a third-party data aggregation service in order to substantially automatically verify the requestor's identity.

In still other embodiments, the system may be configured to prompt a requestor to provide one or more additional pieces of information in order to validate the requestor's identity. This information may include, for example: (1) at least a portion of the requestor's social security number (e.g., last four digits); (2) a name and/or place of birth of the requestor's father; (3) a name, maiden name, and/or place of birth of the requestor's mother; and/or (4) any other information which may be useful for confirming the requestor's identity (e.g., such as information available on the requestor's birth certificate). In other embodiments, the system may be configured to prompt the requestor to provide authorization for the company to check the requestor's social security or other private records (e.g., credit check authorization, etc.) to obtain information that the system may use to confirm the requestor's identity. In other embodiments, the system may prompt the user to provide one or more images (e.g., using a suitable mobile computing device) of an identifying document (e.g., a birth certificate, social security card, driver's license, etc.).

The system may, in response to a user providing one or more responses that matches information that the system receives from one or more third-party data aggregators or through any other suitable background, credit, or other search, substantially automatically authenticate the requestor as the data subject. The system may then continue processing the data subject's request, and ultimately fulfill their request.

In particular embodiments, such as embodiments in which the requestor includes a business (e.g., as in a business to business data subject access request), the system may be configured to authenticate the requesting business using one or more company verification techniques. These one or more company validation techniques may include, for example, validating a vendor contract (e.g., between the requesting business and the company receiving the data subject access request); receiving a matching token, code, or other unique identifier provided by the company receiving the data subject access request to the requesting business; receiving a matching file in possession of both the requesting business and the company receiving the data subject access request; receiving a signed contract, certificate (e.g., digital or physical), or other document memorializing an association between the requesting business and the company receiving the data subject access request; and/or any other suitable method of validating that a particular request is actually made on behalf of the requesting business (e.g., by requesting the requesting business to provide one or more pieces of information, one or more files, one or more documents, etc. that may only be accessible to the requesting business).

In other embodiments, the system may be configured to authenticate a request via integration with a company's employee or customer (e.g., consumer) authentication process. For example, in response to receiving a data subject access request that indicates that the data subject is an employee of the company receiving the data subject access request, the system may be configured to prompt the employee to login to the company's employee authentication system (e.g., Okta, Azure, AD, etc.) In this way, the system may be configured to authenticate the requestor based at least in part on the requestor successfully logging into the authentication system using the data subject's credentials. Similarly, in response to receiving a data subject access request that indicates that the data subject is a customer of the company receiving the data subject access request, the system may be configured to prompt the customer to login to an account associated with the company (e.g., via a consumer portal authentication process). In a particular example, this may include, for example, an Apple ID (for data subject access requests received by Apple). In this way, the system may be configured to authenticate the requestor based at least in part on the requestor successfully logging into the authentication system using the data subject's credentials. In some embodiments, the system may be configured to require the requestor to login using two-factor authentication or other suitable existing employee or consumer authentication process.

Data Subject Blacklist

In various embodiments, a particular organization may not be required to respond to a data subject access request that originates (e.g., is received from) a malicious requestor. A malicious requestor may include, for example: (1) a requestor (e.g., an individual) that submits excessive or redundant data subject access requests; (2) a group of requestors such as researchers, professors, students, NGOs, etc. that submit a plurality of requests for reasons other than those reasons provided by policy, law, etc.; (3) a competitor of the company receiving the data subject access request that is submitting such requests to tie up the company's resources unnecessarily; (4) a terrorist or other organization that may spam requests to disrupt the company's operation and response to valid requests; and/or (5) any other request that may fall outside the scope of valid requests made for reasons proscribed by public policy, company policy, or law. In particular embodiments, the system is configured to maintain a blacklist of such malicious requestors.

In particular embodiments, the system is configured to track a source of each data subject access request and analyze each source to identify sources from which: (1) the company receives a large volume of requests; (2) the company receives a large number of repeat requests; (3) etc. These sources may include, for example: (1) one or more particular IP addresses; (2) one or more particular domains; (3) one or more particular countries; (4) one or more particular institutions; (5) one or more particular geographic regions; (6) etc. In various embodiments, in response to analyzing the sources of the requests, the system may identify one or more sources that may be malicious (e.g., are submitting excessive requests).

In various embodiments, the system is configured to maintain a database of the identified one or more sources (e.g., in computer memory). In particular embodiments, the database may store a listing of identities, data sources, etc. that have been blacklisted (e.g., by the system). In particular embodiments, the system is configured to, in response to receiving a new data subject access request, cross reference the request with the blacklist to determine if the requestor is on the blacklist or is making the request from a blacklisted source. The system may then, in response to determining that the requestor or source is blacklisted, substantially automatically reject the request. In particular embodiments, the blacklist cross-referencing step may be part of the requestor authentication (e.g., verification) discussed above. In various embodiments, the system may be configured to analyze request data on a company by company basis to generate a blacklist. In other embodiments, the system may analyze global data (e.g., all data collected for a plurality of companies that utilize the data subject access request fulfillment system) to generate the blacklist.

In particular embodiments, the system may be configured to fulfill data subject access requests for the purpose of providing a data subject with information regarding what data the company collects and for what purpose, for example, so the data subject can ensure that the company is collecting data for lawful reasons. As such, the system may be configured to identify requestors and other sources of data requests that are made for other reasons (e.g., one or more reasons that would not obligate the company to respond to the request). These reasons may include, for example, malicious or other reasons such as: (1) research by an academic institution by one or more students or professors; (2) anticompetitive requests by one or more competitors; (3) requests by disgruntled former employees for nefarious reasons; (4) etc.

In particular embodiments, the system may, for example, maintain a database (e.g., in computer memory) of former employees. In other embodiments, the system may, for example: (1) identify a plurality of IP addresses associated with a particular entity (e.g., academic organization, competitor, etc.); and (2) substantially automatically reject a data subject access request that originates from the plurality of IP addresses. In such embodiments, the system may be configured to automatically add such identified IP addresses and/or domains to the blacklist.

In still other embodiments, the system is configured to maintain a listing of blacklisted names of particular individuals. These may include, for example, one or more individuals identified (e.g., by an organization or other entity) as submitting malicious data subject access requests).

Figure 4:
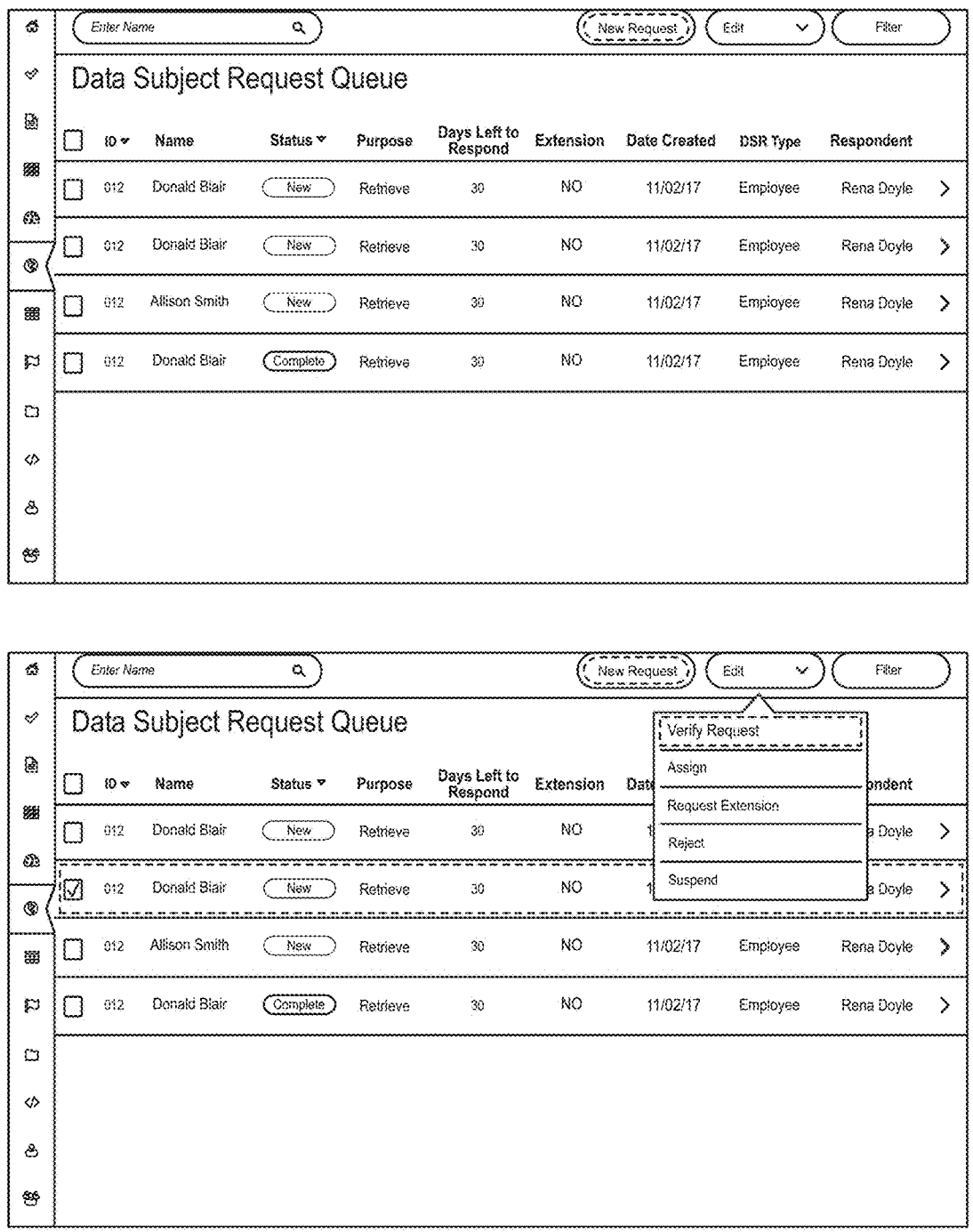
Figure 5:
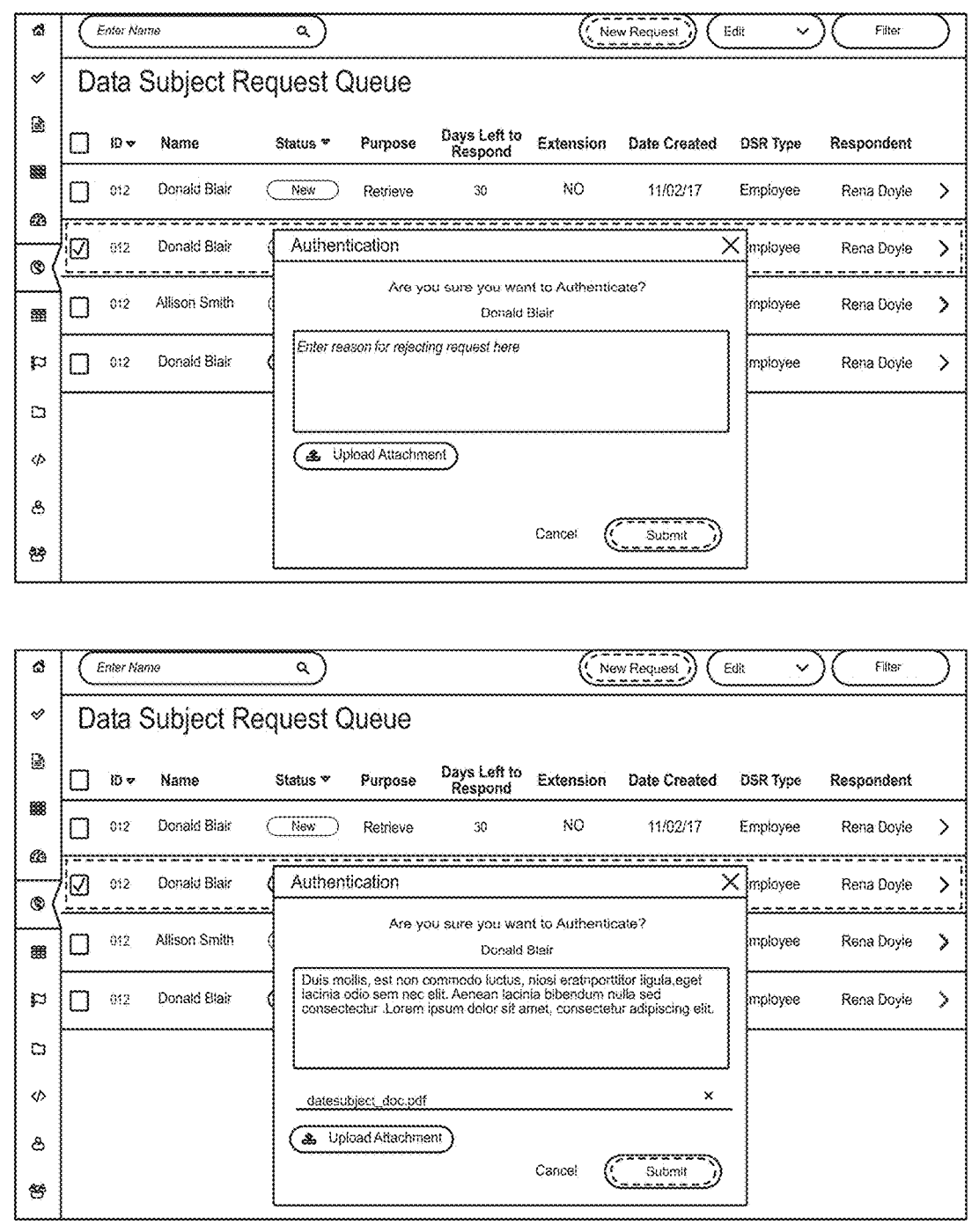

FIG. 4 depicts a queue of pending data subject access requests. As shown in this figure, the first three listed data subject access requests are new and require verification before processing and fulfillment can begin. As shown in this figure, a user (e.g., such as a privacy officer or other privacy controller) may select a particular request, and select an indicia for verifying the request. The user may also optionally select to reject the request. FIG. 5 depicts an authentication window that enables the user to authenticate a particular request. In various embodiments, the user may provide an explanation of why the user is authenticating the request (e.g., because the requestor successfully completed on or more out-of-wallet questions or for any other suitable reason). The user may further submit one or more attachments to support the verification. In this way, the system may be configured to document that the authentication process was performed for each request (e.g., in case there was an issue with improperly fulfilling a request, the company could show that they are following procedures to prevent such improper processing). In other embodiments, the system may enable the user to provide similar support when rejecting a request (e.g., because the requestor was blacklisted, made excessive requests, etc.).

Data Subject Access Request Fulfillment Cost Determination

In various embodiments, as may be understood in light of this disclosure, fulfilling a data subject access request may be particularly costly. In some embodiments, a company may store data regarding a particular data subject in multiple different locations for a plurality of different reasons as part of a plurality of different processing and other business activities. For example, a particular data subject may be both a customer and an employee of a particular company or organization. Accordingly, in some embodiments, fulfilling a data subject access request for a particular data subject may involve a plurality of different information technology (IT) professionals in a plurality of different departments of a particular company or organization. As such, it may be useful to determine a cost of a particular data subject access request (e.g., particularly because, in some cases, a data subject is entitled to a response to their data subject access request as a matter of right at no charge).

In particular embodiments, in response to receiving a data subject access request, the system may be configured to: (1) assign the request to at least one privacy team member; (2) identify one or more IT teams required to fulfill the request (e.g., one or more IT teams associated with one or more business units that may store personal data related to the request); (3) delegate one or more subtasks of the request to each of the one or more IT teams; (4) receive one or more time logs from each individual involved in the processing and fulfillment of the data subject access request; (5) calculate an effective rate of each individual's time (e.g., based at least in part on the individual's salary, bonus, benefits, chair cost, etc.); (6) calculate an effective cost of fulfilling the data subject access request based at least in part on the one or more time logs and effective rate of each of the individual's time; and (7) apply an adjustment to the calculated effective cost that accounts for one or more external factors (e.g., overhead, etc.) in order to calculate a cost of fulfilling the data subject access request.

In particular embodiments, the system is configured to substantially automatically track an amount of time spent by each individual involved in the processing and fulfillment of the data subject access request. The system may, for example, automatically track an amount of time between each individual opening and closing a ticket assigned to them as part of their role in processing or fulfilling the data subject access request. In other embodiments, the system may determine the time spent based on an amount of time provided by each respective individual (e.g., the individual may track their own time and submit it to the system).

In various embodiments, the system is configured to measure a cost of each particular data subject access request received, and analyze one or more trends in costs of, for example: (1) data subject access requests over time; (2) related data subject access requests; (3) etc. For example, the system may be configured to track and analyze cost and time-to-process trends for one or more social groups, one or more political groups, one or more class action groups, etc. In particular, the system may be configured to identify a particular group from which the system receives particularly costly data subject access request (e.g., former and/or current employees, members of a particular social group, members of a particular political group, etc.).

In particular embodiments, the system may be configured to utilize data subject access request cost data when processing, assigning, and/or fulfilling future data subject access requests (e.g., from a particular identified group, individual, etc.). For example, the system may be configured to prioritize requests that are expected to be less costly and time-consuming (e.g., based on past cost data) over requests identified as being likely more expensive. Alternatively, the system may prioritize more costly and time-consuming requests over less costly ones in the interest of ensuring that the system is able to respond to each request in a reasonable amount of time (e.g., within a time required by law, such as a thirty day period, or any other suitable time period).

Customer Satisfaction Integration with Data Subject Access Requests

In various embodiments, the system may be configured to collect customer satisfaction data, for example: (1) as part of a data subject access request submission form; (2) when providing one or more results of a data subject access request to the data subject; or (3) at any other suitable time. In various embodiments, the customer satisfaction data may be collected in the form of a suitable survey, free-form response questionnaire, or other suitable satisfaction data collection format (e.g., thumbs up vs. thumbs down, etc.).

Figure 6:
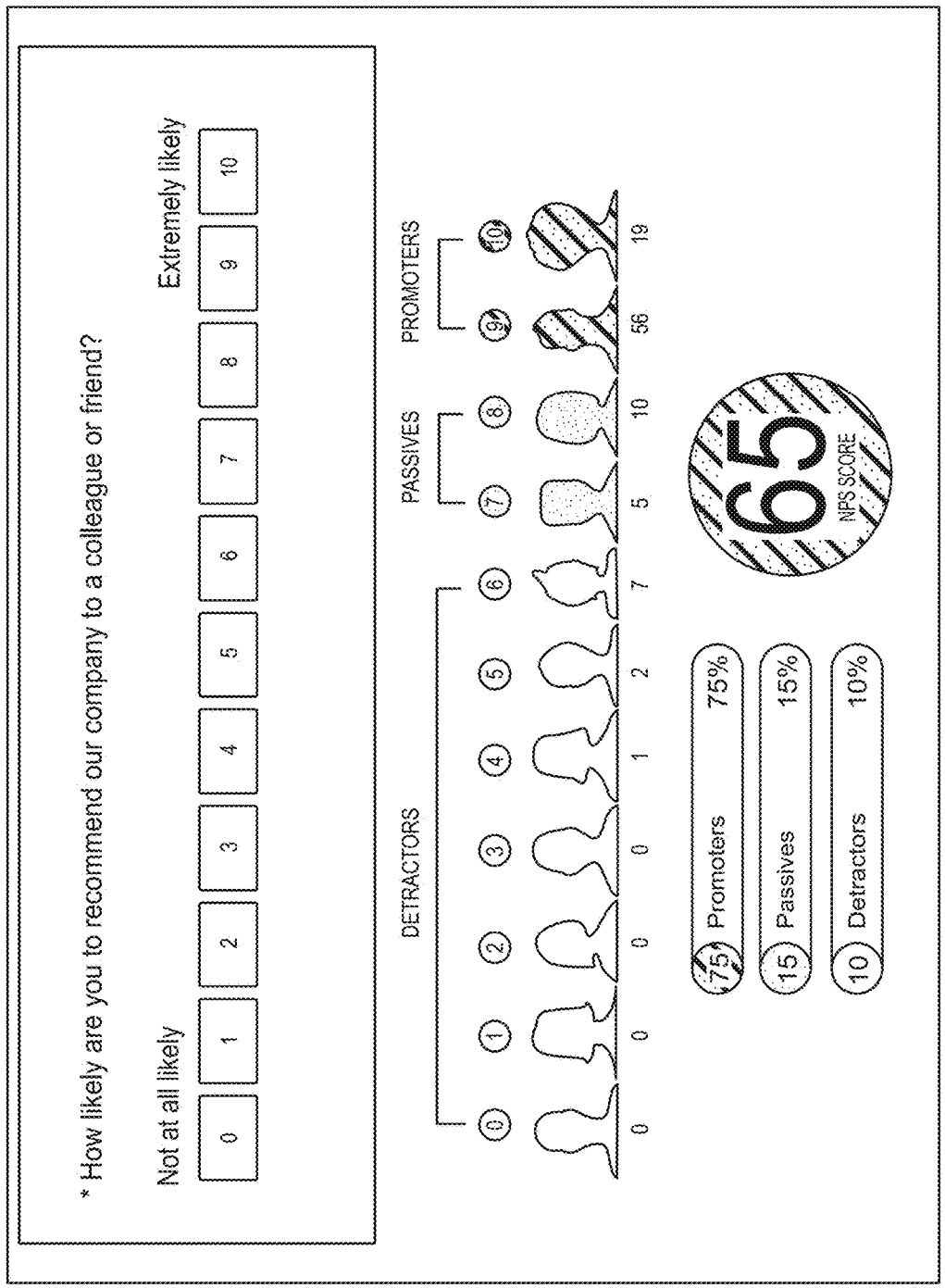

FIG. 6 depicts an exemplary customer satisfaction survey that may be included as part of a data subject access request form, provided along with the results of a data subject access request, provided in one or more messages confirming receipt of a data subject access request, etc. As shown in the figure, the customer satisfaction survey may relate to how likely a customer (e.g., a data subject) is to recommend the company (e.g., to which the data subject has submitted the request) to a friend (e.g., or colleague). In the example shown in FIG. 6, the satisfaction survey may relate to a Net Promoter score (NPS), which may indicate a loyalty of a company's customer relationships. Generally speaking, the Net Promoter Score may measure a loyalty that exists between a provider and a consumer. In various embodiments, the provider may include a company, employer, or any other entity. In particular embodiments, the consumer may include a customer, employee, or other respondent to an NPS survey.

In particular embodiments, the question depicted in FIG. 6 is the primary question utilized in calculating a Net Promoter Score (e.g., "how likely is it that you would recommend our company/product/service to a friend or colleague?"). In particular embodiments, the question is presented with responses ranging from 0 (not at all likely) to 10 (extremely likely). In particular embodiments, the question may include any other suitable scale. As may be understood from FIG. 6, the system may be configured to assign particular categories to particular ratings on the 10 point scale. The system may be configured to track and store responses provided by consumers and calculate an overall NPS score for the provider. The system may be further configured to generate a visual representation of the NPS score, including a total number of responses received for each particular score and category as shown in FIG. 6.

In various embodiments, the system may be configured to measure data related to any other suitable customer satisfaction method (e.g., in addition to NPS). By integrating a customer satisfaction survey with the data subject access request process, the system may increase a number of consumers that provide one or more responses to the customer satisfaction survey. In particular embodiments, the system is configured to require the requestor to respond to the customer satisfaction survey prior to submitting the data subject access request.

Exemplary Technical Platforms

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general-purpose computer, special-purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

Figure 7:
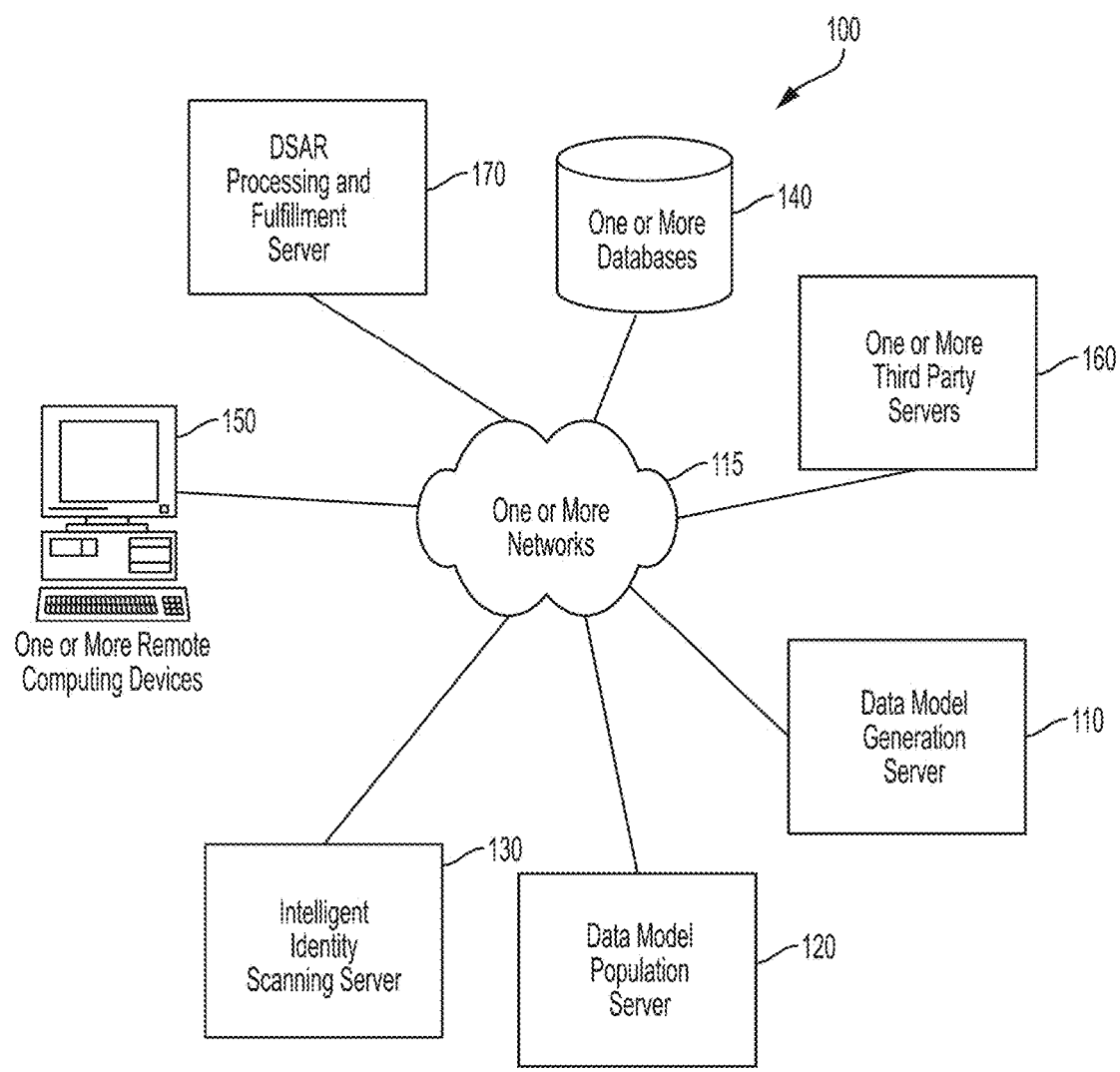
FIG. 7 depicts a data subject request processing and fulfillment system according to particular embodiments.

FIG. 7 is a block diagram of a data subject access request processing and fulfillment system 100 according to a particular embodiment. In various embodiments, the data subject access request processing and fulfillment system is part of a privacy compliance system (also referred to as a privacy management system), or other system, which may, for example, be associated with a particular organization and be configured to aid in compliance with one or more legal or industry regulations related to the collection and storage of personal data. I As may be understood from FIG. 7, the data subject access request processing and fulfillment system 100 includes one or more computer networks 115, a Data Model Generation Server 110, a Data Model Population Server 120, an Intelligent Identity Scanning Server 130, One or More Databases 140 or other data structures, one or more remote computing devices 150 (e.g., a desktop computer, laptop computer, tablet computer, smartphone, etc.), and One or More Third Party Servers 160. In particular embodiments, the one or more computer networks 115 facilitate communication between the Data Model Generation Server 110, Data Model Population Server 120, Intelligent Identity Scanning Server 130, One or More Databases 140, one or more remote computing devices 150 (e.g., a desktop computer, laptop computer, tablet computer, smartphone, etc.), One or More Third Party Servers 160, and DSAR Processing and Fulfillment Server 170. Although in the embodiment shown in FIG. 1, the Data Model Generation Server 110, Data Model Population Server 120, Intelligent Identity Scanning Server 130, One or More Databases 140, one or more remote computing devices 150 (e.g., a desktop computer, laptop computer, tablet computer, smartphone, etc.), and One or More Third Party Servers 160, and DSAR Processing and Fulfillment Server 170 are shown as separate servers, it should be understood that in other embodiments, one or more of these servers and/or computing devices may comprise a single server, a plurality of servers, one or more cloud-based servers, or any other suitable configuration.

The one or more computer networks 115 may include any of a variety of types of wired or wireless computer networks such as the Internet, a private intranet, a public switch telephone network (PSTN), or any other type of network. The communication link between The Intelligent Identity Scanning Server 130 and the One or More Third Party Servers 160 may be, for example, implemented via a Local Area Network (LAN) or via the Internet. In other embodiments, the One or More Databases 140 may be stored either fully or partially on any suitable server or combination of servers described herein.

Figure 8:
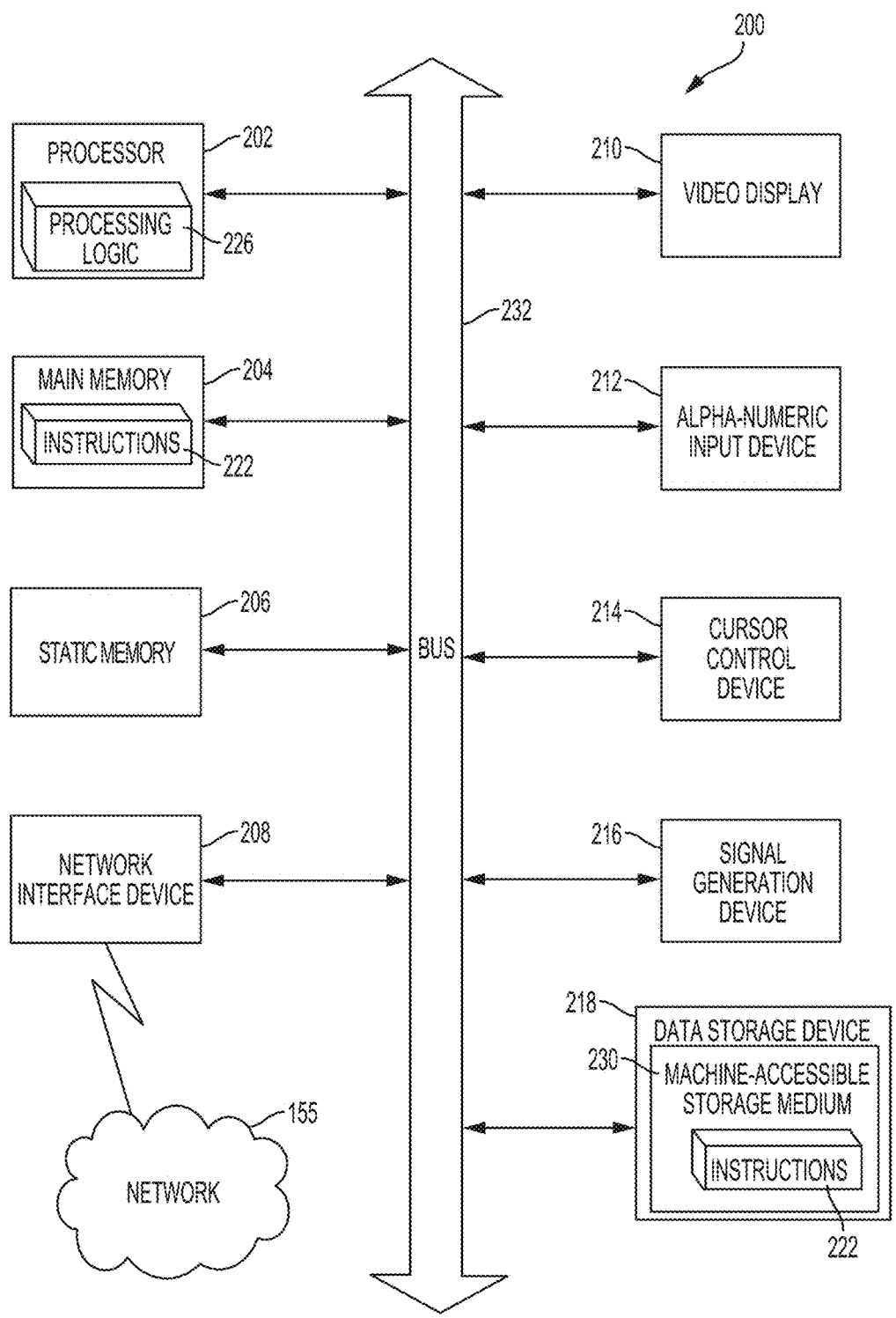
FIG. 8 is a schematic diagram of a computer (such as the data model generation server 110, or data model population server 120) that is suitable for use in various embodiments of the data subject request processing and fulfillment system shown in FIG. 7.

FIG. 8 illustrates a diagrammatic representation of a computer 200 that can be used within the data subject access request processing and fulfillment system 100, for example, as a client computer (e.g., one or more remote computing devices 130 shown in FIG. 7), or as a server computer (e.g., Data Model Generation Server 110 shown in FIG. 7). In particular embodiments, the computer 200 may be suitable for use as a computer within the context of the data subject access request processing and fulfillment system 100 that is configured to generate a data model and map one or more relationships between one or more pieces of data that make up the model.

In particular embodiments, the computer 200 may be connected (e.g., networked) to other computers in a LAN, an intranet, an extranet, and/or the Internet. As noted above, the computer 200 may operate in the capacity of a server or a client computer in a client-server network environment, or as a peer computer in a peer-to-peer (or distributed) network environment. The Computer 200 may be a personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 200 includes a processing device 202, a main memory 204 (e.g., read-only memory (ROM), flash memory, dynamic random access memory (DRAM) such as synchronous DRAM (SDRAM) or Rambus DRAM (RDRAM), etc.), static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computer 120 may further include a network interface device 208. The computer 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a non-transitory computer-accessible storage medium 230 (also known as a non-transitory computer-readable storage medium or a non-transitory computer-readable medium) on which is stored one or more sets of instructions (e.g., software instructions 222) embodying any one or more of the methodologies or functions described herein. The software instructions 222 may also reside, completely or at least partially, within main memory 204 and/or within processing device 202 during execution thereof by computer 200—main memory 204 and processing device 202 also constituting computer-accessible storage media. The software instructions 222 may further be transmitted or received over a network 115 via network interface device 208.

While the computer-accessible storage medium 230 is shown in an exemplary embodiment to be a single medium, the term "computer-accessible storage medium" should be understood to include a single medium or multiple media (e.g., a centralized or distributed database, and/or associated caches and servers) that store the one or more sets of instructions. The term "computer-accessible storage medium" should also be understood to include any medium that is capable of storing, encoding or carrying a set of instructions for execution by the computer and that cause the computer to perform any one or more of the methodologies of the present invention. The term "computer-accessible storage medium" should accordingly be understood to include, but not be limited to, solid-state memories, optical and magnetic media, etc.

Systems for Managing Data Subject Access Requests

In various embodiments, the system may include a ticket management system and/or other systems for managing data subject access requests. Various embodiments of such systems are described below.

Overview

Ticket management systems, according to various embodiments, are adapted to receive data subject access requests (DSAR's) from particular data subjects, and to facilitate the timely processing of valid DSAR's by an appropriate respondent. In particular embodiments, the ticket management system receives DSAR's via one or more webforms that each may be accessed via an appropriate link on a respective web page. In other embodiments, the system may receive DSAR's through any other suitable mechanism, such as via a computer software application (e.g., a messaging application such as Slack, Twitter), or through entry by a representative who may receive the information, for example, via suitable paper forms or over the phone.

The ticket management system may include a webform creation tool that is adapted to allow a user to create customized webforms for receiving DSAR's from various different data subject types and for routing the requests to appropriate individuals for processing. The webform creation tool may, for example, allow the user to specify the language that the form will be displayed in, what particular information is to be requested for the data subject and/or provided by the data subject, who any DSAR's that are received via the webform will be routed to, etc. In particular embodiments, after the user completes their design of the webform, the webform creation tool generates code for the webform that may be cut and then pasted into a particular web page.

The system may be further adapted to facilitate processing of DSAR's that are received via the webforms, or any other suitable mechanism. For example, the ticket management system may be adapted to execute one or more of the following steps for each particular DSAR received via the webforms (or other suitable mechanism) described above: (1) before processing the DSAR, confirm that the DSAR request was actually submitted by the particular data subject of the DSAR (or, for example, by an individual authorized to make the DSAR request on the data subject's behalf, such as a parent, guardian, power-of-attorney holder, etc.)—any suitable method may be used to confirm the identity of the entity/individual submitting the DSAR—for example, if the system receives the DSAR via a third-party computer system, the system may validate authentication via API secret, or by requiring a copy of one or more particular legal documents (e.g., a particular contract between two particular entities)—the system may validate the identity of an individual by, for example, requiring the individual (e.g., data subject) to provide particular account credentials, by requiring the individual to provide particular out-of-wallet information, through biometric scanning of the individual (e.g., finger or retinal scan), or via any other suitable identity verification technique; (2) if the DSAR was not submitted by the particular data subject, deny the request; (3) if the DSAR was submitted by the particular data subject, advance the processing of the DSAR; (4) route the DSAR to the correct individual(s) or groups internally for handling; (5) facilitate the assignment of the DSAR to one or more other individuals for handling of one or more portions of the DSAR; and/or (6) facilitate the suspension of the data subject access request. In particular embodiments, the system may perform any one or more of the above steps automatically. The system then generates a receipt for the DSAR request that the user can use for a transactional record of their submitted request.

In particular embodiments, the ticket management system may be adapted to generate a graphical user interface (e.g., a DSAR request-processing dashboard) that is adapted to allow a user (e.g., a privacy officer of an organization that is receiving the DSAR) to monitor the progress of any the DSAR requests. The GUI interface may display, for each DSAR, for example, an indication of how much time is left (e.g., quantified in days and/or hours) before a legal and/or internal deadline to fulfill the request. The system may also display, for each DSAR, a respective user-selectable indicium that, when selected, may facilitate one or more of the following: (1) verification of the request; (2) assignment of the request to another individual; (3) requesting an extension to fulfill the request; (4) rejection of the request; or (5) suspension of the request.

As noted immediately above, and elsewhere in this application, in particular embodiments, any one or more of the above steps may be executed by the system automatically. As a particular example, the system may be adapted to automatically verify the identity of the DSAR requestor and then automatically fulfill the DSAR request by, for example, obtaining the requested information via a suitable data model and communicating the information to the requestor. As another particular example, the system may be configured to automatically route the DSAR to the correct individual for handling based at least in part on one or more pieces of information provided (e.g., in the webform).

Operation of Example Implementation

Figure 12:
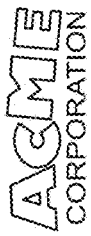

FIGS. 9-49 are screen shots that demonstrate the operation of a particular embodiment. FIGS. 9-12 show a graphical user interface (GUI) of an example webform construction tool. FIG. 9 shows a user working to design a webform called "Web_form_1". As may be understood from the vertical menu shown on the left-hand side of the screen, the webform construction tool allows users to design a webform by: (1) specifying the details of the form (via the "Form Details" tab); (2) defining the fields that will be displayed on the webform (via the "Webform Fields" tab); (3) defining the styling of the webform (via the "Form Styling" tab); and (4) defining various settings associated with the webform (via the "Settings" tab). As shown in FIGS. 10-12, the user may also specify text to be displayed on the webform (e.g., via a "Form Text" tab).

Figure 10:
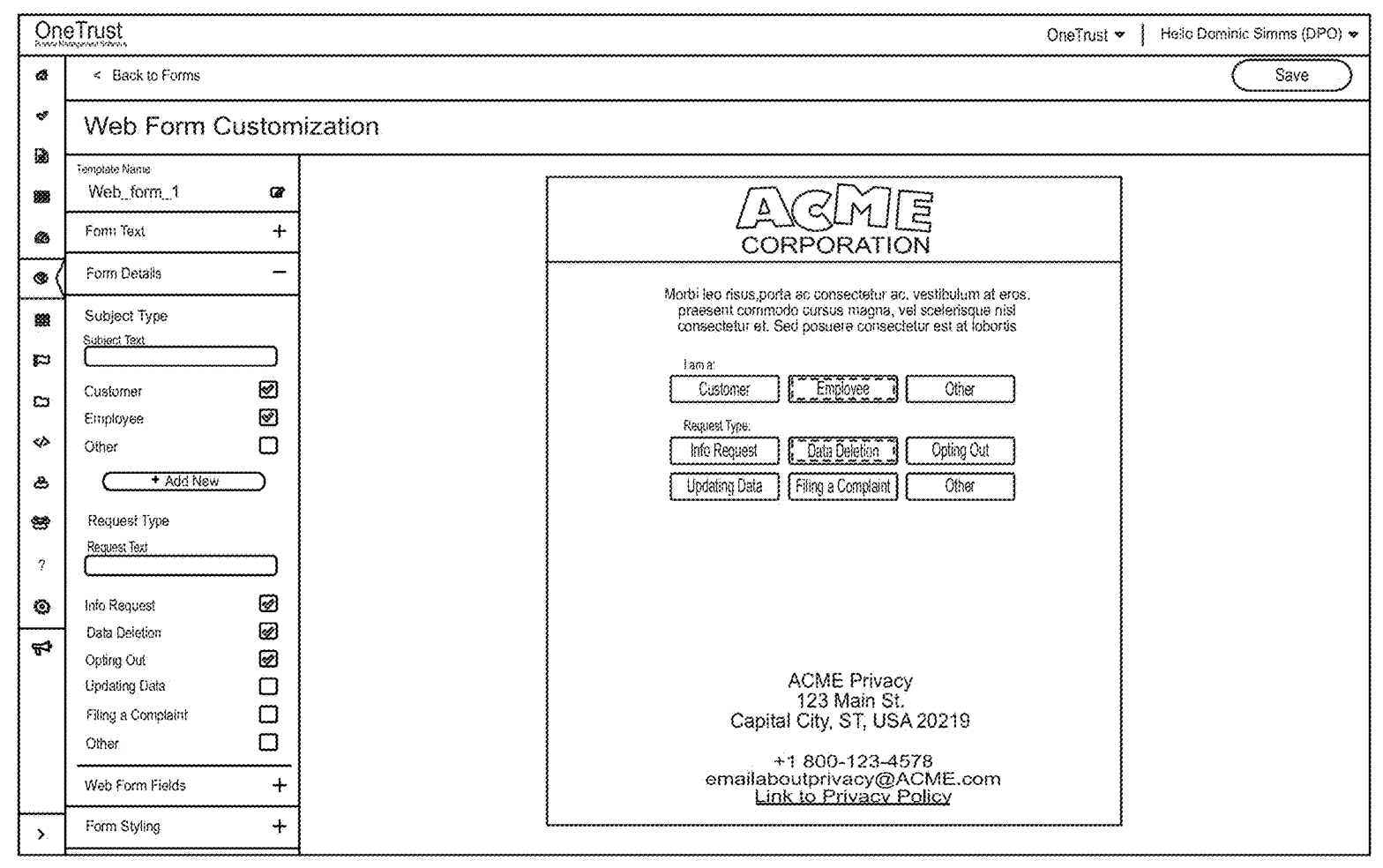

FIG. 10 shows that, by selecting the "Form Details" tab, the user may define which answers a requestor will be able to specify on the webform in response to prompts for information regarding what type of individual they are (customer, employee, etc.) and what type of request they are making via the webform. Example request types include: (1) a request for all personal data that an organization is processing for the data subject (a copy of the personal data in a commonly used, machine-readable format); (2) a request for all such personal data to be deleted; (3) a request to update personal data that the organization is storing for the data subject; (4) a request to opt out of having the organization use the individual's personal information in one or more particular ways (e.g., per the organization's standard business practices); (5) file a complaint; and/or (6) other.

Figure 11:
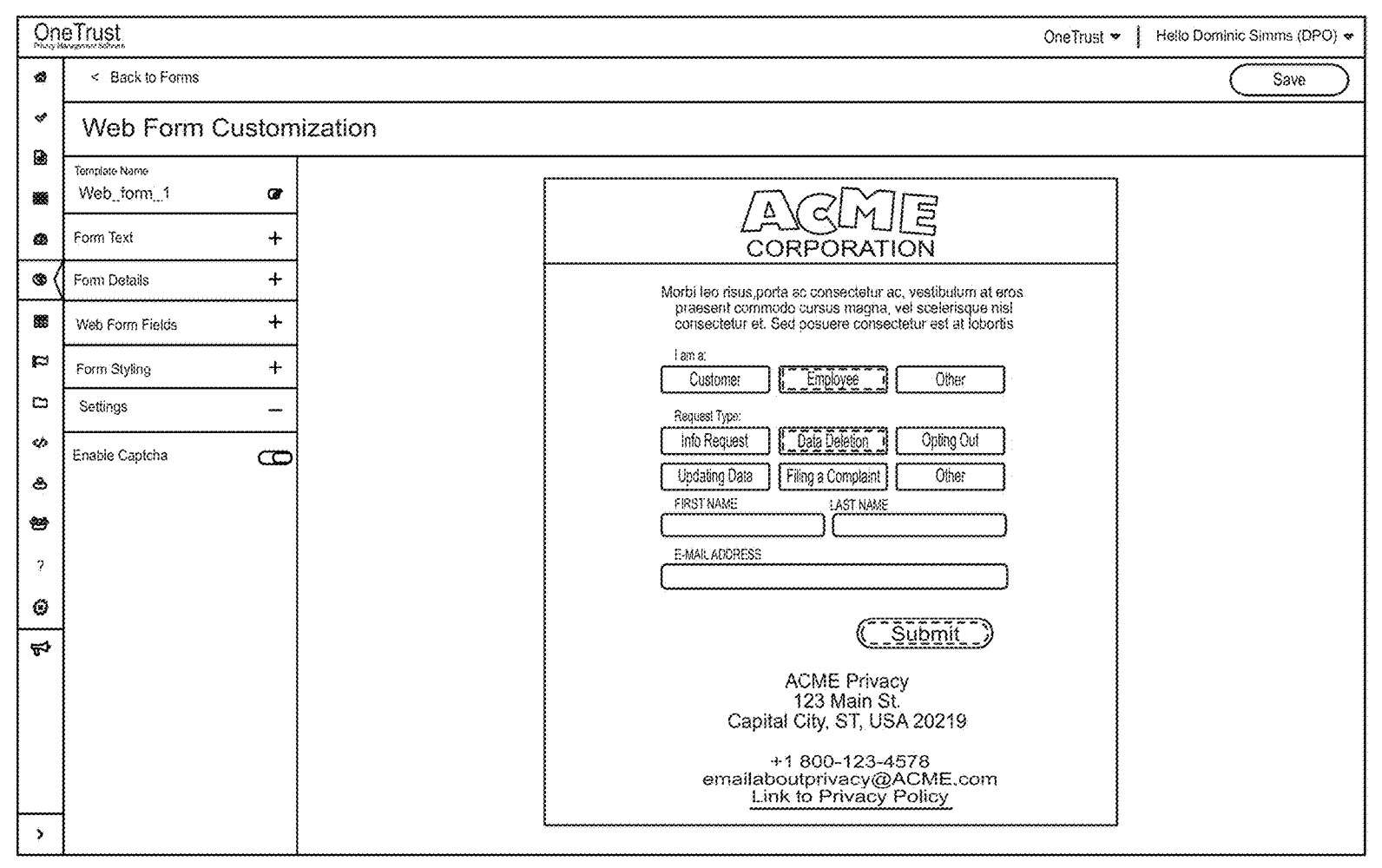

FIG. 11 shows that, by selecting the "Settings" tab, the user may specify various system settings, such as whether Captcha will be used to verify that information is being entered by a human, rather than a computer.

FIG. 12 shows that, by selecting the Form Styling tab, the user may specify the styling of the webform. The styling may include, for example: (1) a header logo; (2) header height; (3) header color; (4) body text color; (5) body text size; (6) form label color; (7) button color; (8) button text color; (9) footer text color; (10) footer text size; and/or any other suitable styling related to the webform.

In other embodiments, the system is configured to enable a user to specify, when configuring a new webform, what individual at a particular organization (e.g., company) will be responsible for responding to requests made via the webform. The system may, for example, enable the user to define a specific default sub-organization (e.g., within the organization) responsible for responding to DSAR's submitted via the new webform. As such, the system may be configured to automatically route a new DSAR made via the new webform to the appropriate sub-organization for processing and fulfillment. In various embodiments, the system is configured to route one or more various aspects of the DSAR to one or more different sub-organizations within the organization.

In still other embodiments, the system is configured to enable a user generating webforms to assign multiple webforms to multiple different suborganizations within an organization. For example, an organization called ACME, Inc. may have a website for each of a plurality of different brands (e.g., sub-organizations) under which ACME sells products (e.g., UNICORN Brand T-shirts, GRIPP Brand Jeans, etc.). As may be understood in light of this disclosure, each website for each of the particular brands may include an associated webform for submitting DSAR's. Each respective webform may be configured to route a DSAR made via its associated brand website to a particular sub-organization within ACME for handling DSAR's related to the brand.

As noted above, after the user uses the webform construction tool to design a particular webform for use on a particular web page, the webform construction tool generates code (e.g., HTML code) that may be pasted into the particular web page to run the designed webform page.

Figure 13:
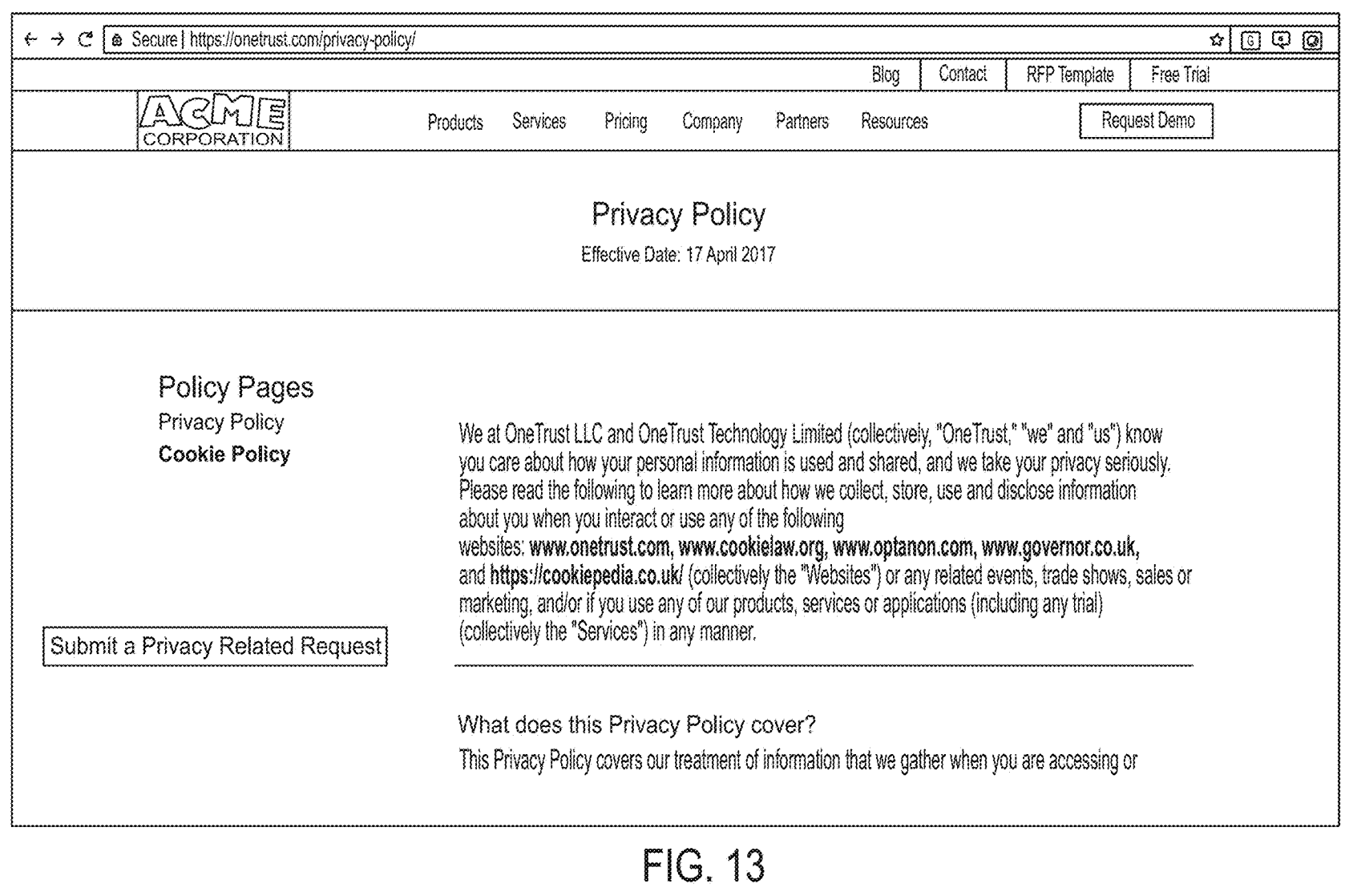

FIG. 13 shows the privacy webpage of a company (e.g., the ACME corporation). As shown in this figure, a requestor may submit a DSAR by selecting a "Submit a Privacy Related Request" button on the web page.

Figure 14:

FIG. 14 shows a webform that is displayed after a requestor selects the "Submit a Privacy Related Request" button on the privacy webpage of FIG. 13. As may be understood from this figure, the requestor may complete the webform by specifying which type of user they are, and what type of request they are making. The webform also asks the requestor to provide enough personal information to confirm their identity (e.g., and fulfill the request). As shown in this figure, the system may prompt a user submitting a DSAR to provide information such as, for example: (1) what type of requestor the user is (e.g., employee, customer, etc.); (2) what the request involves (e.g., requesting info, opting out, deleting data, updating data, etc.); (3) first name; (4) last name; (5) email address; (6) telephone number; (7) home address; (8) one or more other pieces of identifying information; and/or (9) one or more details associated with the request. FIG. 15 shows an example populated version of the webform.

As shown in FIG. 16, after a requestor completes the webform and selects a "submit" indicia, the system displays a message to the requestor indicating that their DSAR has been successfully submitted. The system also displays a Request ID associated with the request. In response to the requestor successfully submitting the request, the system may also send an email to the requestor confirming the request. An example of a suitable confirmation email is shown in FIG. 17.

In various embodiments, the system includes a dashboard that may be used by various individuals within an organization (e.g., one or more privacy officers of an organization) to manage multiple DSAR requests. As discussed above, the dashboard may display DSAR's submitted, respectively, to a single organization, any of multiple different sub-organizations (divisions, departments, subsidiaries etc.) of a particular organization, and/or any of multiple independent organizations. For example, the dashboard may display DSAR's that were submitted from a parent organization and from the parent organization's U.S. and European subsidiaries. This may be advantageous, for example, because it may allow an organization to manage all DSAR requests of all of its sub-organizations centrally.

FIGS. 18-29, 31-33, 35-40, and 45-47 depict various example user-interface screens of a DSAR request-management dashboard. As may be understood from FIG. 18, after an appropriate user (e.g., a privacy officer associated with a particular organization) logs into the system, the system may display a Data Subject Request Queue that may, for example, display a listing of all data subject access requests that the appropriate individual has been designated to process. As shown in FIG. 18, each data subject access request may be represented by a respective row of information that includes: (1) an ID number for the request; (2) the name of the data subject who has submitted the request; (3) the status of the request; (4) the number of days that are left to respond to the request (e.g., according to applicable laws and/or internal procedures); (5) an indication as to whether the deadline to respond to the request has been extended; (6) a creation date of the request; (7) an indication of the type of requestor that submitted the request (customer, employee, etc.); (8) the name of the individual who has been assigned to process the request (e.g., the respondent). This screen may also include selectable "Edit" and "Filter" buttons that respectively facilitate acting on and filtering the various requests displayed on the page.

As shown in FIG. 19, in response to a respondent selecting the edit button, the system displays a dropdown menu allowing the respondent to select between taking the following actions: (1) verify the request; (2) assign the request to another individual; (3) request an extension; (4) reject the request; or (5) suspend the request.

FIGS. 20 and 21 show a message that the system displays to the respondent in response to the respondent selecting the "verify" option. As shown in this figure, the system prompts the respondent to indicate whether they are sure that they wish to authenticate the request. The system also presents an input field where the respondent can enter text to be displayed to the requestor along with a request for the requestor to provide information verifying that they are the data subject associated with the request. After the respondent populates the input field, they may submit the request by selecting a "Submit" button.

In other embodiments, the input field may enable the respondent to provide one or more supporting reasons for a decision, by the respondent, to authenticate the request. The respondent may also upload one or more supporting documents (such as an attachment). The supporting documents or information may include, for example, one or more documents utilized in confirming the requestor's identity, etc.

In response to the respondent selecting the Submit button, the system changes the status of the request to "In Progress" and also changes the color of the request's status from orange to blue (or to any other suitable color)—see FIG. 22. The system also generates and sends a message (e.g., an electronic or paper message) to the requestor asking them to submit information verifying the request. The message may include the text that the respondent entered in the text box of FIGS. 20 and 21.

Figure 24:
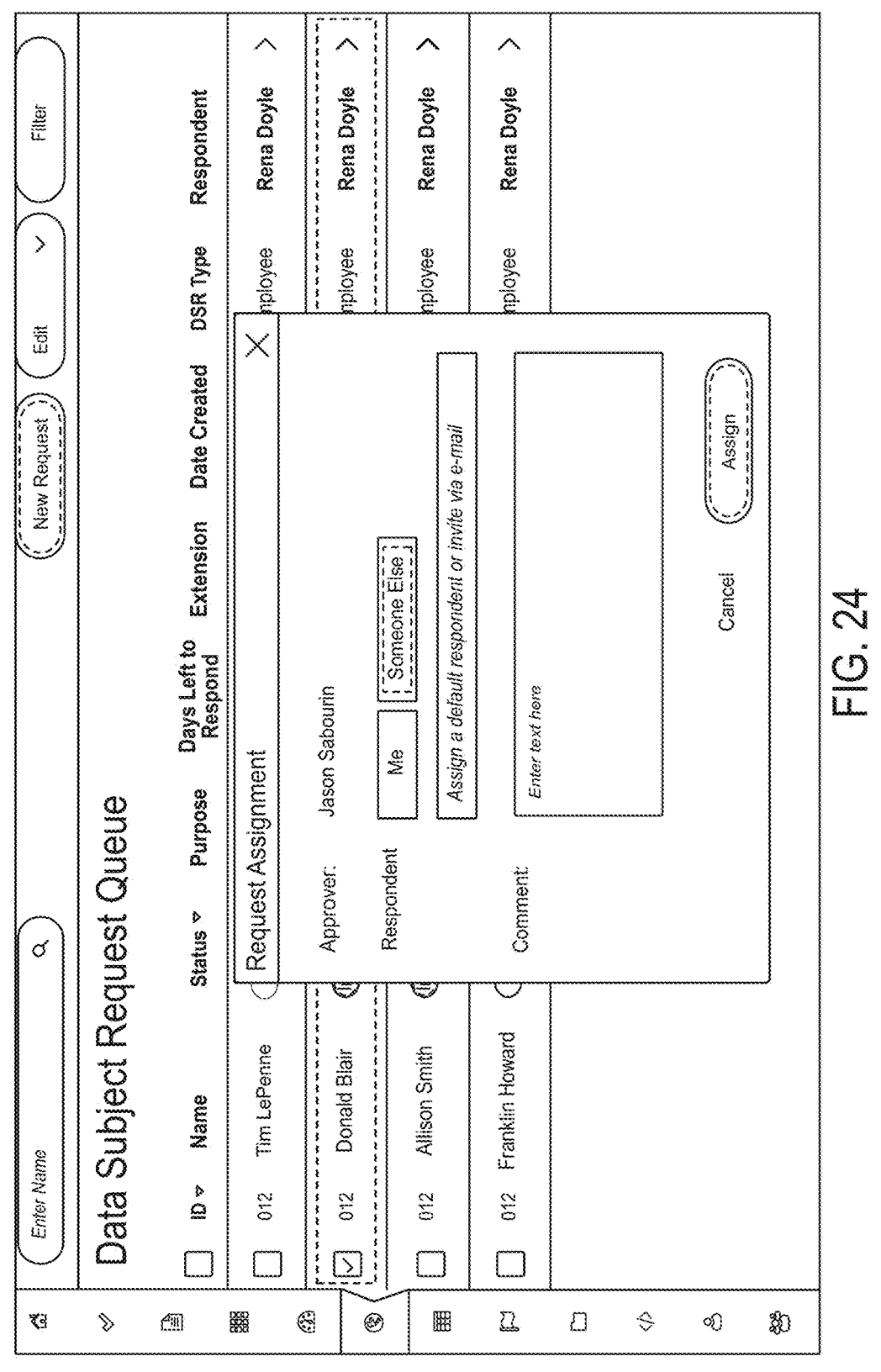
Figure 25:
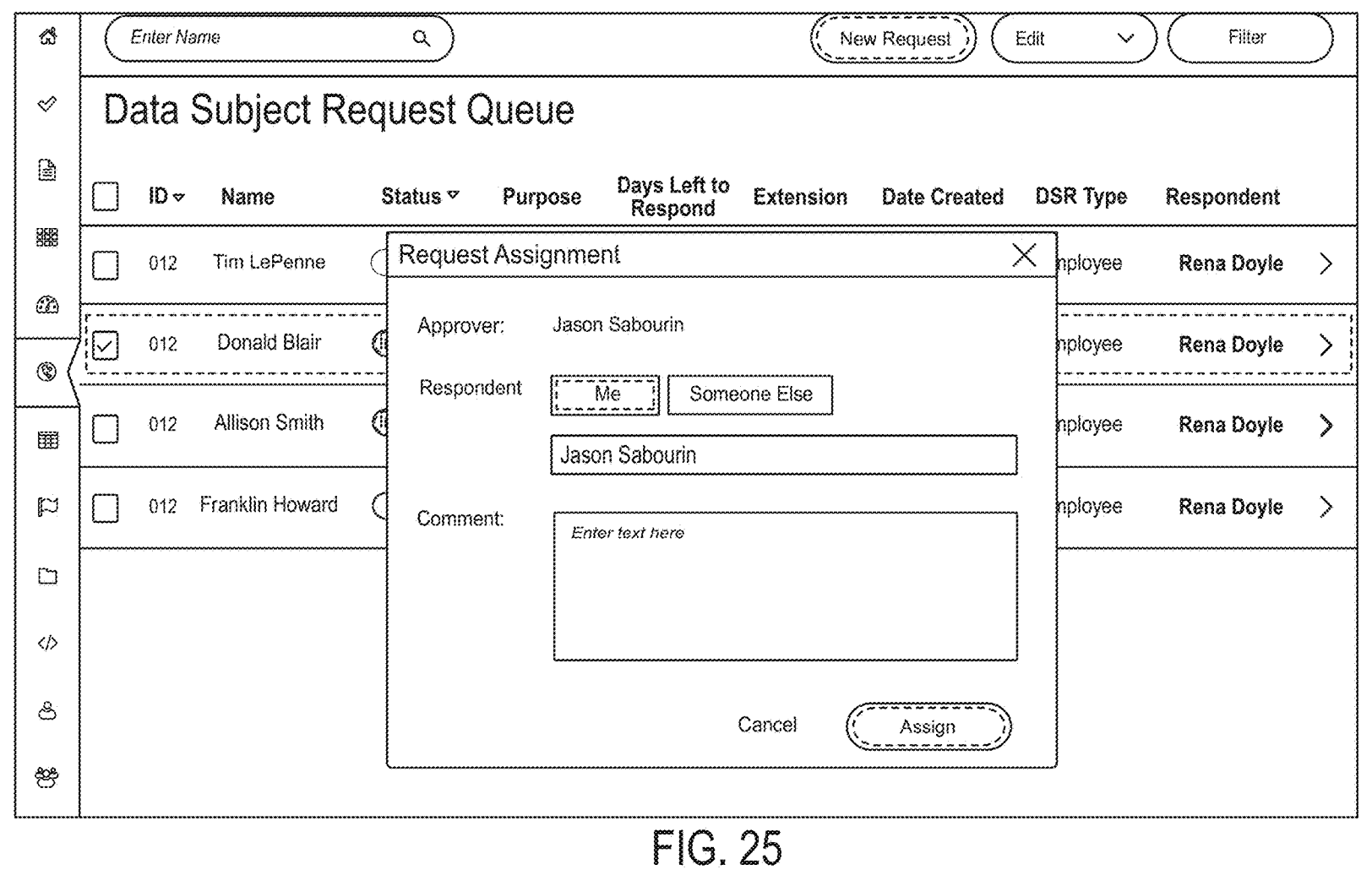

As shown in FIGS. 23-25, in response to a respondent selecting the "Edit" button and then selecting the "Assign" indicia from the displayed dropdown menu, the system displays a Request Assignment interface that allows a respondent to indicate who the request should be assigned to. For example, the respondent may indicate that they will be handling the request, or assign the request to another suitable individual, who may, for example, then be designated as the respondent for the request. If the respondent assigns the request to another individual, they may also provide an email address or other correspondence information for the individual. The Request Assignment interface includes a comment box for allowing a respondent to add a message to the individual that the assignment will be assigned to regarding the assignment. In response to the respondent selecting the "Assign" button, the system assigns the request to the designated individual for handling. If the request has been assigned to another individual, the system automatically generates and sends a message (e.g., an electronic message such as an email or SMS message) to the individual informing them of the assignment.

As shown in FIGS. 26-28, in response to a respondent selecting the "Edit" button and then selecting the "Reject" indicia from the displayed dropdown menu, the system displays a Reject Request interface. This interface includes a comment box for allowing a respondent to add a message to the requestor as to why the request was rejected. In response to the respondent selecting the "Submit" button, the system changes the status of the request to "Rejected" and changes the color of the request's status indicator to red (See FIG. 29). The system may also automatically generate a message (e.g., an electronic or paper message) to the requestor notifying them that their request has been rejected and displaying the text that the respondent entered into the Reject Request interface of FIG. 28. An example of such a message is shown in FIG. 30.

Figure 32:
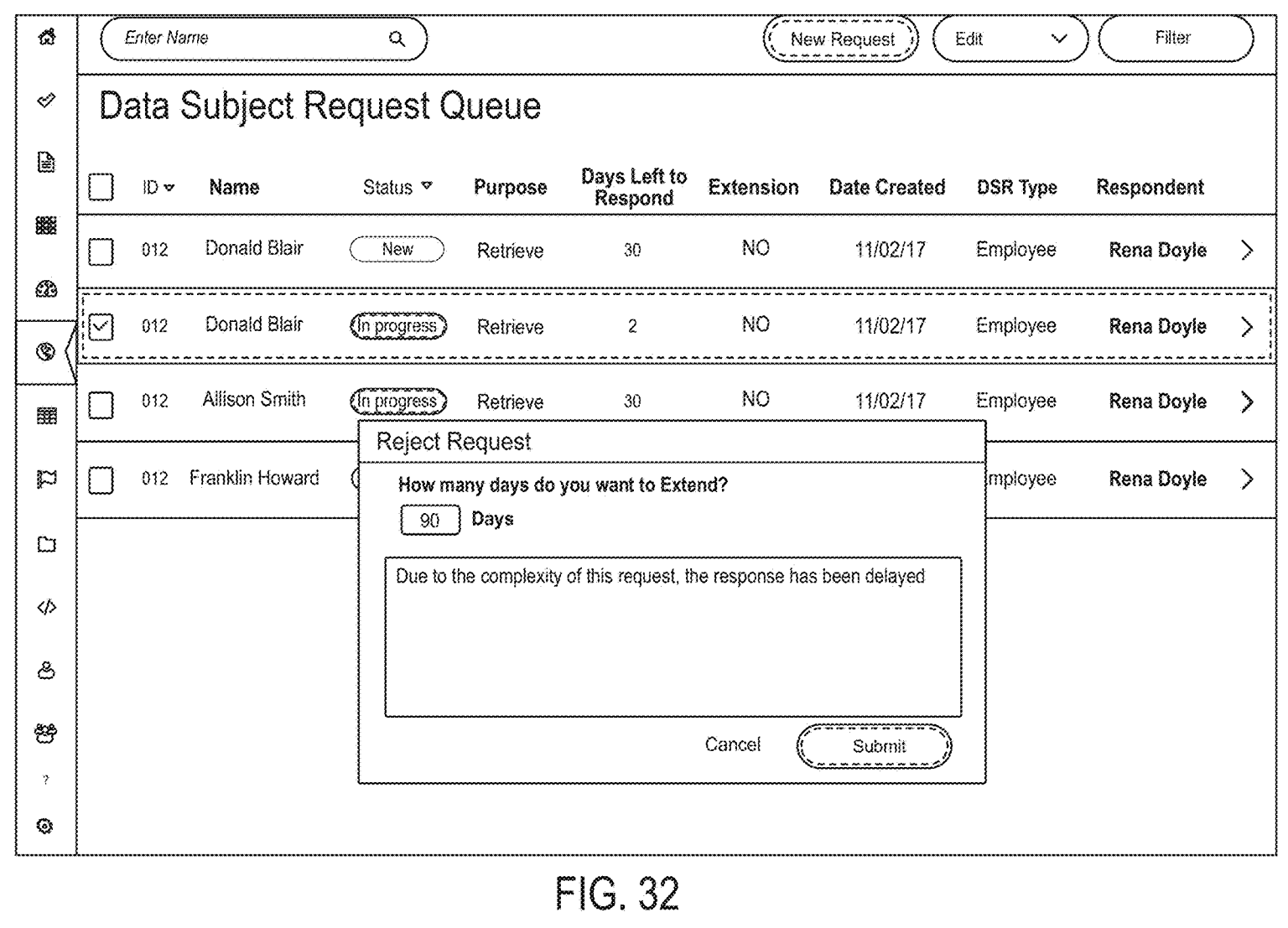
Figure 34:

As shown in FIGS. 31-32, in response to a respondent selecting the "Edit" button and then selecting the "Request Extension" indicia from the displayed dropdown menu, the system displays a Request Extension interface. This includes a text box for allowing a user to indicate the number of days for which they would like to extend the current deadline for responding to the request. For example, the dialog box of FIG. 32 shows the respondent requesting that the current deadline be extended by 90 days. In response to the respondent entering a desired extension duration and selecting the "Submit" button, the system updates the deadline in the system's memory (e.g., in an appropriate data structure) to reflect the extension. For instance, in the example of FIG. 32, the system extends the deadline to be 90 days later than the current deadline. As shown in FIG. 33, the system also updates the "Days Left to Respond" field within the Data Subject Request Queue to reflect the extension (e.g., from 2 days from the current date to 92 days from the current date). As shown in FIG. 34, the system may also generate an appropriate message (e.g., an electronic or paper message) to the requestor indicating that the request has been delayed. This message may provide a reason for the delay and/or an anticipated updated completion date for the request.

In particular embodiments, the system may include logic for automatically determining whether a requested extension complies with one or more applicable laws or internal policies and, in response, either automatically grant or reject the requested extension. For example, if the maximum allowable time for replying to a particular request is 90 days under the controlling laws and the respondent requests an extension that would result in the fulfillment of the request 91 or more days from the date that the request was submitted, the system may automatically reject the extension request. In various embodiments, the system may also communicate, to the respondent (e.g., via a suitable electronic message or text display on a system user interface) an explanation as to why the extension request was denied, and/or a maximum amount of time (e.g., a maximum number of days) that the deadline may be extended under the applicable laws or policies. In various embodiments, if the system determines that the requested extension is permissible under the applicable laws and/or policies, the system may automatically grant the extension. In other embodiments, the system may be configured to automatically modify a length of the requested extension to conform with one or more applicable laws and/or policies.

Figure 36:
Figure 37:
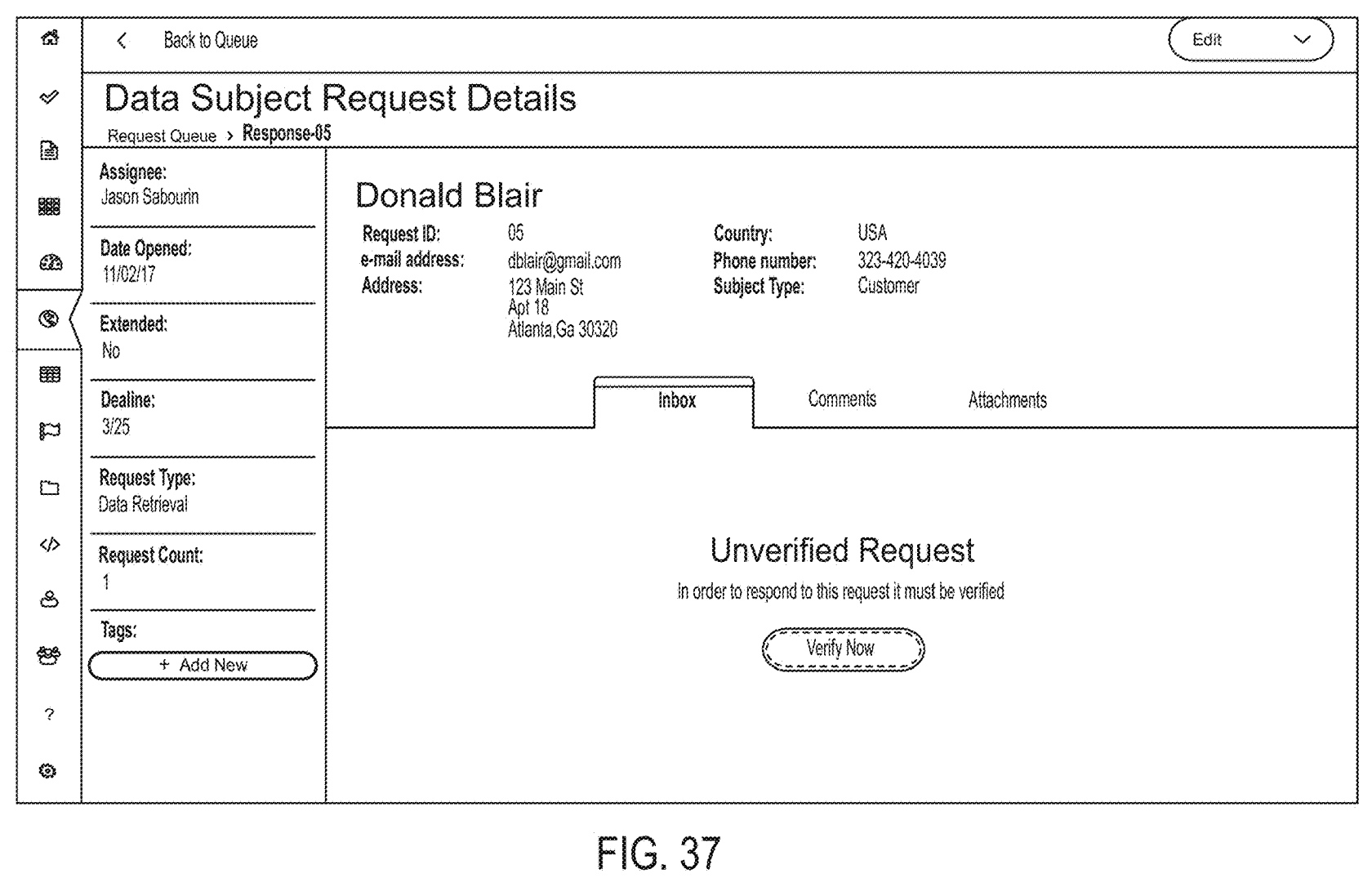

As shown in FIGS. 35-40, a respondent may obtain additional details regarding a particular request by selecting (e.g., clicking on) the request on the Data Subject Request Queue screen. For example, FIG. 36 shows a Data Subject Request Details screen that the system displays in response to a respondent selecting the "Donald Blair" request on the user interface screen of FIG. 35. As shown in FIG. 36, the Data Subject Request Details screen shows all correspondence between the organization and the requesting individual regarding the particular data subject access request. As may be understood from FIG. 37, when a respondent selects a particular correspondence (e.g., email), the system displays the correspondence to the respondent for review or other processing.

Figure 38:
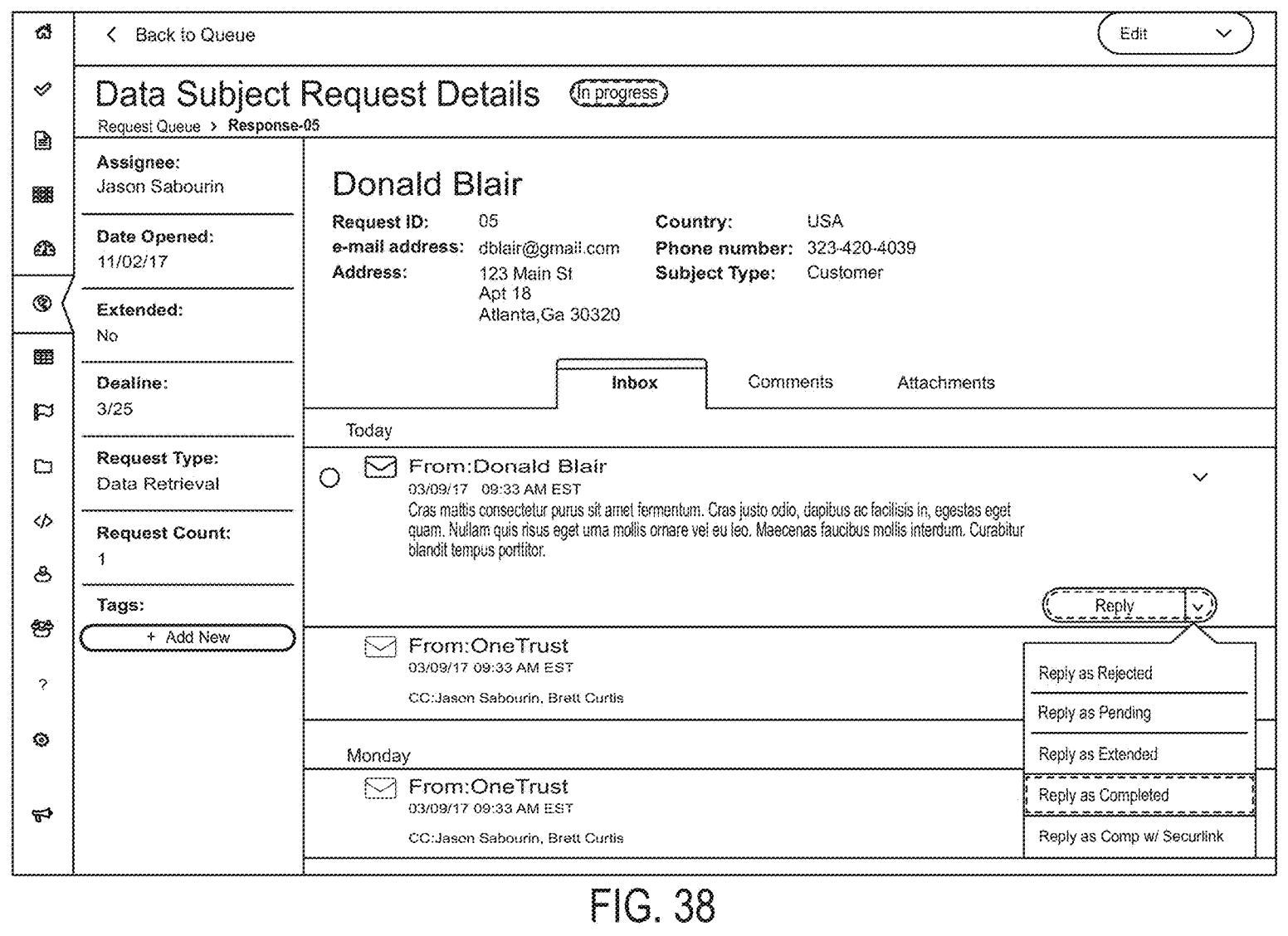

As shown in FIG. 38, in various embodiments, the system may provide a selectable "Reply" indicia that allows the respondent to reply to particular correspondence from an individual. As may be understood from this figure, in response to the respondent selecting the "Reply" indicia, the system may display a dropdown menu of various standard replies. For example, the dropdown menu may provide the option of generating a reply to the requestor indicating that the request has been rejected, is pending, has been extended, or that the request has been completed.

As shown in FIG. 39, in response to the respondent selecting "Reply as Completed", the system may display a draft email to the requestor explaining that the request has been completed. The respondent may then edit this email and send the correspondence (e.g., via email) to the requestor by selecting a "Send as Complete" indicia. As shown in FIG. 40, the system may, in response, display an indicator adjacent the correspondence indicating that the correspondence included a reply indicating that the request was complete. This may be useful in allowing individuals to understand the contents of the correspondence without having to open it.

Figure 42:
Figure 43:
Figure 45:
Figure 46:
Figure 48:
Figure 49:
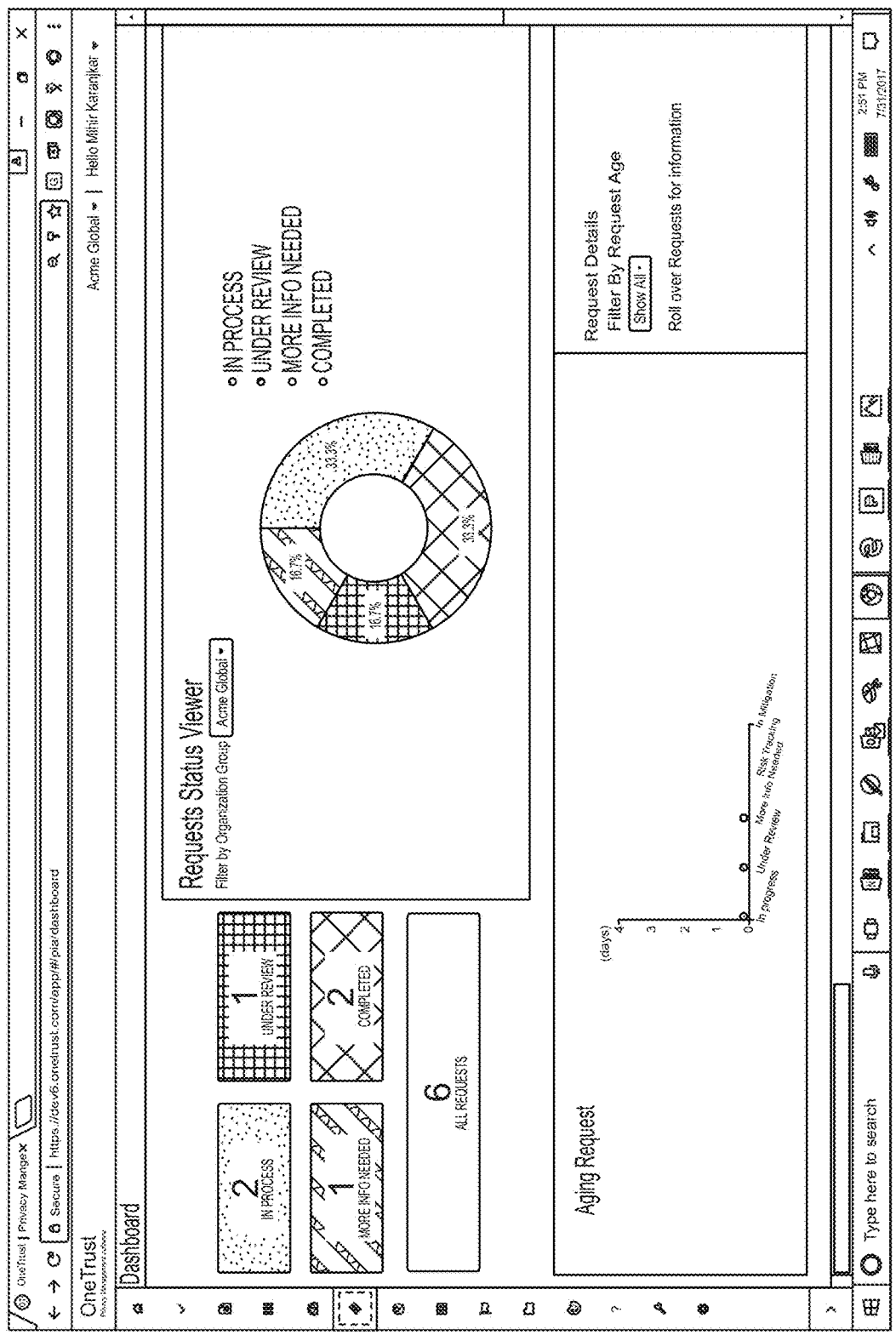

FIG. 41 shows an example email automatically generated by the system in response to the respondent selecting "Reply as Completed" on the screen shown in FIG. 38. As shown in FIG. 41, the correspondence may include a secure link that the requestor may select to access the data that was requested in the DSAR. In particular embodiments, the link is a link to a secure website, such as the website shown in FIG. 42, that provides access to the requested data (e.g., by allowing a user to download a .pdf file, or other suitable file, that includes the requested data). As shown in FIG. 42, the website may require multiple pieces of data to verify that the requestor is permitted to access the site. For example, in order to access the website, the requestor may be required to provide both the unique ID number of the request, and an authentication token, which the system may send to the user via email—See FIGS. 43 and 44.

FIGS. 45-49 are computer screen shots that depict additional user interfaces according to various embodiments.

Additional Concepts

Automated Data Subject Verification

In various embodiments, before a data subject request can be processed, the data subject's identity needs to be verified. In various embodiments, the system provides a mechanism to automatically detect the type of authentication required for a particular data subject based on the type of Data Subject Access Request being made and automatically issues a request to the data subject to verify their identity against that form of identification. For example, a subject rights request might only require two types of authentication, but a deletion request may require four types of data to verify authentication. The system may automatically detect which is type of authentication is required based on the DSAR and send an appropriate request to the data subject to verify their identity.

Intelligent Prioritization of DSAR's

In various embodiments, the system may be adapted to prioritize the processing of DSAR's based on metadata about the data subject of the DSAR. For example, the system may be adapted for: (1) in response to receiving a DSAR, obtaining metadata regarding the data subject; (2) using the metadata to determine whether a priority of the DSAR should be adjusted based on the obtained metadata; and (3) in response to determining that the priority of the DSAR should be adjusted based on the obtained metadata, adjusting the priority of the DSAR.

Examples of metadata that may be used to determine whether to adjust the priority of a particular DSAR include: (1) the type of request, (2) the location from which the request is being made, (3) current sensitivities to world events, (4) a status of the requestor (e.g., especially loyal customer, important client, competitor, etc.), or (5) any other suitable metadata.

In various embodiments, in response to the system determining that the priority of a particular DSAR should be elevated, the system may automatically adjust the deadline for responding to the DSAR. For example, the system may update the deadline in the system's memory and/or modify the "Days Left to Respond" field (See FIG. 19) to include a fewer number of days left to respond to the request. Alternatively, or in addition, the system may use other techniques to convey to a respondent that the request should be expedited (e.g., change the color of the request, send a message to the respondent that they should process the request before non-prioritized requests, etc.)

In various embodiments, in response to the system determining that the priority of a particular DSAR should be lowered, the system may automatically adjust the deadline for responding to the DSAR by adding to the number of days left to respond to the request. In other embodiments, the system may be configured to prioritize more demanding requests (e.g., requests that may require more effort and/or resources to process), for example, to ensure that the requests can be fulfilled within legally defined deadlines or timelines.

Various embodiments of a data subject access request prioritization system are described more fully below. In particular embodiments, a Data Subject Access Request Prioritization Module 5000 is configured to receive a data subject access request, obtain one or more pieces of metadata associated with the data subject access request, analyze the one or more pieces of metadata associated with the data subject access request to determine or adjust a prioritization level of the data subject access request, and digitally store the determined or adjusted prioritization level of the data subject access request in computer memory.

Figure 50:
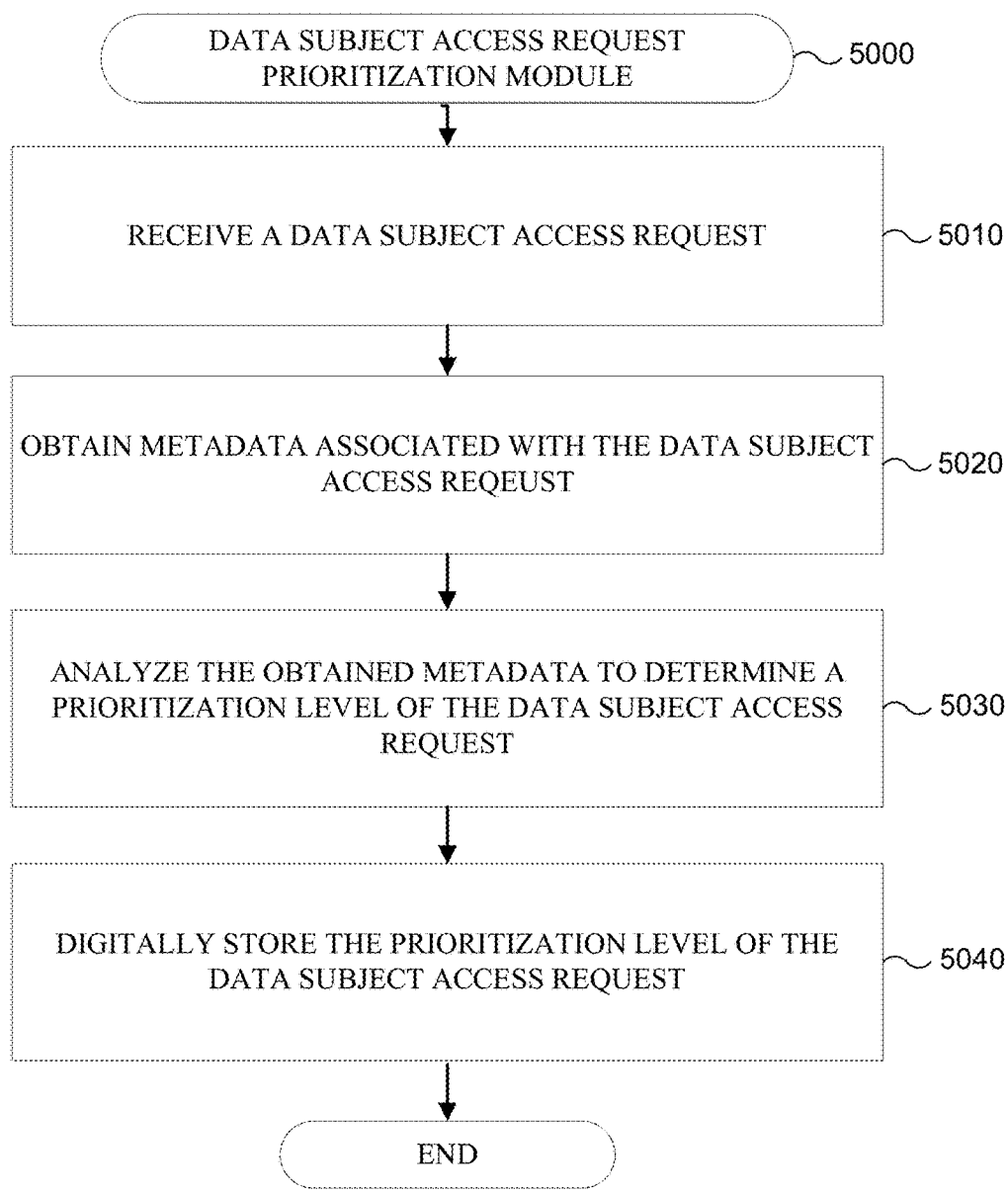
FIG. 50 is a flowchart showing an example of a processes performed by a Data Subject Access Request Prioritization Module according to various embodiments

Turning to FIG. 50, when executing the Data Subject Access Request Prioritization Module 5000, the system begins, at step 5010, by receiving a data subject access request. In various embodiments, the system receives the request via a suitable web form. In certain embodiments, the request comprises a particular request to perform one or more actions with any personal data stored by a particular organization regarding the requestor. For example, in some embodiments, the request may include a request to view one or more pieces of personal data stored by the system regarding the requestor. In other embodiments, the request may include a request to delete one or more pieces of personal data stored by the system regarding the requestor. In still other embodiments, the request may include a request to update one or more pieces of personal data stored by the system regarding the requestor. Additionally, as described above, data subjects may be entitled to certain rights related to the data subject's personal data that is collected, stored, or otherwise processed by an organization, and the rights may be asserted or requested by a data subject as a data subject access request. The organization may fulfill the data subject access request. To fulfill the data subject access request, the system can retrieve the identified one or more pieces of personal data associated with the data subject to perform the requested operation to the identified one or more pieces of personal data associated with the data subject.

The system may further be configured to process the request by validating the identity of the requestor. The system may be configured to substantially automatically (e.g., automatically) authenticate and/or validate an identity of a data subject using any suitable technique. These techniques may include, for example: (1) one or more credit-based and/or public- or private-information-based verification techniques; (2) one or more company verification techniques (e.g., in the case of a business-to-business data subject access request); (3) one or more techniques involving integration with a company's employee authentication system; (4) one or more techniques involving a company's (e.g., organization's) consumer portal authentication process; (5) etc.

In particular embodiments, when authenticating a data subject (e.g., validating the data subject's identity), the system may be configured to execute particular identity confirmation steps, for example, by interfacing with one or more external systems (e.g., one or more third-party data aggregation systems). For example, the system, when validating a data subject's identity, may begin by verifying that a person with the data subject's name, address, social security number, or other identifying characteristic (e.g., which may have been provided by the data subject as part of the data subject access request) actually exists. In still other embodiments, the system may be configured to utilize one or more other third-party systems (e.g., such as LexisNexis, IDology, RSA, etc.), which may, for example, compile utility and phone bill data, property deeds, rental agreement data, and other public records for various individuals. After confirming the existence of a person with the one or more characteristics provided by the data subject, the system may be configured to confirm that the person making the data subject access request is, in fact, the data subject.

In various embodiments, the system may apply a prioritization level to each data subject access request. The prioritization level can be used to attribute an urgency, importance, and/or sensitivity in fulfilling each particular data subject access request. Additionally, the prioritization level may be used to place the data subject access requests in an order of fulfillment (e.g., in a data processing queue for fulfillment). The prioritization level applied to the data subject access request after the system receives the data subject access request can be based on the data included in the data subject access request itself, which may include, for example, an identity of the data subject, an identity of the particular organization receiving the data subject access request, a requested deadline for receiving fulfillment of the data subject access request, among others. In some implementations, the prioritization level can be two levels (e.g., "standard" and "urgent" or "standard" and "sensitive"), and in some implementations, the system can include three or more different prioritization levels (e.g., "high," "medium," and "low").

Continuing to step 5020, the system is configured to obtain one or more pieces of metadata associated with the data subject access request. The one or more pieces of metadata describe additional information related to the data subject access request (e.g., describe information about the data subject of the data subject access request), and may include a multitude of additional information. Examples of metadata that may relate to the priority of a particular data subject access request can include, for example: (1) a request type associated with the data subject access request; (2) a location from which the data subject access request is being made; (3) current sensitivities to world events (e.g., a war occurring in a country where a particular organization has a server that stores data subject's information); (4) a status of the requestor issuing the data subject access request; and (5) a time in which the data subject access request was made. The metadata related to the request type identifies what the requestor is requesting from the particular organization. For example, the request type can be a request to advise the requestor of the personal data that the organization has stored related to the requestor (e.g., a subject's rights request) or a request to delete one or more pieces of personal data stored by the particular organization regarding the requestor (e.g., a data subject deletion request).

In particular embodiments, the metadata may include, for example: (1) the requestor's IP address (e.g., or other location data); (2) the requestor's MAC address; (3) one or more regulations that apply to the request, etc. In particular embodiments, the metadata that determines the prioritization of the request may include the type of request (e.g., a request for data, a request to delete data, and/or a request to correct data). Requests for deletion and production of data may, for example, be prioritized ahead of data correction requests. In other embodiments, the system may prioritize requests that have a legal basis (e.g., any suitable request under the GDPR) over requests to which a data subject may not be legally entitled (e.g., but that the organization may still fulfil, but at a lower priority level behind other more pressing requests).

In various embodiments, the metadata may be provided to the system as part of, or along with, the data subject access request. However, in some embodiments, the metadata may be provided substantially automatically (e.g., automatically) subsequently to the system receiving the data subject access request, or an individual of the particular organization (e.g., a privacy officer) may manually request the one or more pieces of metadata subsequently to receiving the data subject access request. In some embodiments, the system may obtain one or more pieces of metadata from a third party (e.g., a web browser identifying current events in a particular location). Additionally, in some implementations, the data subject access request and/or metadata can be provided to the system via a secure terminal or secure link between a computer system that includes the metadata (e.g., the computer system of the requestor) and the system to prevent interception of the data or unwarranted access to the additional information. Additionally, the data of the data subject access request and/or metadata may be encrypted for the transmission of the data.

At step 5030, the system is configured to analyze the one or more pieces of obtained metadata to determine a prioritization level of the data subject access request. The system may analyze the one or more pieces of metadata to identify information related to an urgency for fulfilling the particular data subject access request.

In some implementations, a prioritization level is applied to the data subject access request prior to the system receiving and/or analyzing the one or more pieces of metadata, as described above. This initial prioritization level may be applied based on data provided in the data subject access request (e.g., an identification of the requestor). The system may obtain the one or more pieces of metadata, as described above, and determine whether the one or more pieces of metadata relate to a priority of fulfilling the data subject access request. The system may perform the determination by analyzing the contents of the one or more pieces of metadata for information related to, for example: (1) a request type associated with the data subject access request; (2) a location from which the data subject access request is being made; (3) current sensitivities to world events (e.g., a war occurring in a country where a particular organization has a server that stores data subject's information); (4) a status of the requestor issuing the data subject access request (e.g., customer); and (5) a time in which the data subject access request was made.

In response to the system determining that the obtained one or more pieces of metadata relate to the priority of fulfilling the data subject access request, the system may analyze the metadata to determine whether the prioritization level of the data subject access request should be adjusted. The system may analyze the content of the metadata that was determined to be related to the prioritization level of the data subject access request. For example, if one of the one or more pieces of metadata relate to a location from which the data subject access request is being made and the content of the metadata identifies that the location from which the request is being made is a different continent than the location the data servers that store the personal data for the particular organization (receiving the data subject access request), then the system may determine that the urgency and sensitivity of this particular metadata necessitates an adjustment to the prioritization level of the data subject access request. Specifically, the system may determine that the data transmission and rules involving storage of personal data in different continents indicates a greater risk and more attention required in fulfilling the data subject access request. In continuing the above example, if the content of the metadata identified that the location from which the request is being made is the same continent where the data servers that store the personal data for the particular organization are located, then the system may determine that an adjustment to the prioritization level of the data subject access request is not necessitated.

In response to determining that the prioritization level of the data subject access request should be adjusted based on the obtained one or more pieces of metadata, the system may adjust the prioritization level of the data subject access request for fulfillment. As described above, the system may adjust the prioritization level based on the analyzed content of the metadata that was determined to be related to the prioritization level of the data subject access request. When the system determines that the urgency, importance, and/or sensitivity of the one or more pieces of obtained metadata necessitate an adjustment to the prioritization level, the system can increase the prioritization level of the data subject access request from, for example, a "standard" prioritization level to an "urgent" prioritization level, or a "normal" prioritization level to a "high" prioritization level. Additionally, the system may determine that the content of the obtained metadata reduces the urgency, importance, and/or sensitivity of data subject access request, and the system can decrease the prioritization level of the data subject access request from, for example, a "urgent" prioritization level to an "standard" prioritization level, or a "normal" prioritization level to a "low" prioritization level.

In various embodiments, the prioritization level may be stored by the system and presented (e.g., via a user interface to the privacy officer of the organization) as a prioritization indicator associated with the data subject access request to show the prioritization level of the data subject access request has been adjusted. For example, the system can store a listing of data subject access requests, and a column within a user interface presentation of the listing of data subject access requests can provide the prioritization indicator that could present one color (e.g., yellow) for a "standard" prioritization level and a different color (e.g., red) for an "urgent" prioritization level.

Further, in some embodiments, in response to adjusting the prioritization level of the data subject access request, the system may modify a completion date for fulfillment of the data subject access request (e.g., the completion data may be stored in a database of the system and presented in a user interface to a privacy officer of the organization). For example, when the system decreases the prioritization level of the data subject access request, the system may move the completion date back by modifying the completion date to a modified completion date that is a later date than the initial completion date (e.g., modifying the completion date from Dec. 29, 2018 to Dec. 31, 2018). Likewise, in some embodiments, when the system increases the prioritization level of the data subject access request, the system may move the completion date forward by modifying the completion date to a modified completion date that is an earlier date than the initial completion date (e.g., modifying the completion date from Dec. 29, 2018 to Dec. 27, 2018). In some embodiments, the completion date can be shown as "Days Left to Respond," so the system may calculate the days left from a current date to the completion date, and the present the number of days left until the completion date from the current date.

In various embodiments, in response to adjusting the prioritization level of the data subject access request, the system may generate a prioritization message (e.g., email or other type of electronic communication) to indicate that the prioritization level of the data subject access request has been adjusted. Further, the system may electronically communicate the prioritization message to at least one privacy team member that is assigned to fulfill the data subject access request (e.g., a privacy officer for the particular organization).

In some embodiments, a prioritization level is first applied to the data subject access request subsequently to the system analyzing the one or more pieces of metadata associated with the data subject access request. In such embodiments, the system may analyze the one or more pieces of metadata, and in response determine a prioritization level for the data subject access request (i.e., the prioritization level is not adjusted based on the analysis of the one or more pieces of metadata because the prioritization is first determined after the one or more pieces of metadata are analyzed).

Further, at step 5040, the system is configured to digitally store the prioritization level of the data subject access request in computer memory. Additionally, in embodiments where the prioritization level is adjusted, the system is configured to digitally store the adjusted prioritization level of the data subject access request in computer memory. The system may access the stored prioritization level (or adjusted prioritization level) for each of a plurality of data subject access request and place the data subject access requests in an order of fulfillment (e.g., in a data processing queue for fulfillment).

Data Subject Access Request Prioritization User Experience

FIG. 51 depicts an exemplary user interface that may be included to assist in prioritizing the fulfillment of the data subject access requests. For example, the user interface can be presented to the privacy officer assigned to fulfill the data subject access requests. As shown in the Figure, the user interface may present a data subject access request queue for fulfillment, which may include a prioritization column along with additional columns (e.g., ID column, a name of requestor column, etc.) for each data subject access request to provide information for the particular organization to fulfill the data subject access request. In the exemplary user interface, a prioritization indicator is included for each data subject access request where the prioritization indicators include prioritization levels of "Low," "Normal," and "Urgent." The privacy officer or other individual within a particular organization responsible for fulfilling the data subject access request may arrange and organize their fulfillment of the data subject access requests based on the prioritization level provided. The data subject access requests may, for example, be sorted based on the prioritization levels (e.g., where the data subject access requests with an "Urgent" prioritization level are grouped at the top of the data subject request queue followed by the data subject access requests with a "Normal" prioritization level, and then the data subject access requests with a "Low" prioritization level) or the other columns. Additionally, the data subject access requests may be filtered based on the prioritization levels (e.g., where the data subject access requests with an "Urgent" prioritization level are only shown in the data subject request queue).

Automatic Deletion of Data Subject Records Based on Detected Systems

In particular embodiments, in response a data subject submitting a request to delete their personal data from an organization's systems, the system may: (1) automatically determine where the data subject's personal data is stored; and (2) in response to determining the location of the data (which may be on multiple computing systems), automatically facilitate the deletion of the data subject's personal data from the various systems (e.g., by automatically assigning a plurality of tasks to delete data across multiple business systems to effectively delete the data subject's personal data from the systems). In particular embodiments, the step of facilitating the deletion may comprise, for example: (1) overwriting the data in memory; (2) marking the data for overwrite; (2) marking the data as free (e.g., and deleting a directory entry associated with the data); and/or (3) any other suitable technique for deleting the personal data. In particular embodiments, as part of this process, the system uses an appropriate data model (see discussion above) to efficiently determine where all of the data subject's personal data is stored.

Automatic Determination of Business Processes that Increase Chance of Deletion Requests In various embodiments, the system is adapted to store, in memory, a log of DSAR actions. The system may also store, in memory, additional information regarding the data subjects of each of the requests. The system may use this information, for example, to determine which business processes are most commonly associated with a data subject submitting a request to have their personal information deleted from the organization's systems. The organization may then use this information to revise the identified business processes in an effort to reduce the number of deletion requests issued by data subjects associated with the business processes.

As a particular example, the system may analyze stored information to determine that a high number (e.g., 15%) of all participants in a company's loyalty program submit requests to have their personal information deleted from the company's systems. In response to making this determination, the system may issue an electronic alert to an appropriate individual (e.g., a privacy officer of the company), informing them of the high rate of members of the company's loyalty program issuing personal data delete requests. This alert may prompt the individual to research the issue and try to resolve it.

CONCLUSION

Although embodiments above are described in reference to various privacy compliance monitoring systems, it should be understood that various aspects of the system described above may be applicable to other privacy-related systems, or to other types of systems, in general.

While this specification contains many specific embodiment details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A computer-implemented data processing method for prioritizing data subject access requests, the method comprising:

receiving, by one or more processors, a data subject access request from a requestor comprising one or more request parameters, wherein the one or more request parameters comprise one or more pieces of personal data associated with the requestor;

applying, by the one or more processors, an initial prioritization level to the received data subject access request based on the one or more request parameters;

at least partially in response to receiving the data subject access request, obtaining, by the one or more processors, one or more pieces of metadata associated with a data subject of the data subject access request, wherein the one or more pieces of metadata comprise: a request type associated with the data subject access request; a location from which the data subject access request is being made; current sensitivities to world events; a status of the requestor issuing the data subject access request; or a time in which the data subject access request was made;

determining, by the one or more processors, whether the one or more pieces of metadata relate to a priority of fulfilling the data subject access request;

in response to determining that the obtained one or more pieces of metadata relate to the priority of fulfilling the data subject access request, analyzing, by the one or more processors, the one or more pieces of obtained metadata to determine whether the initial prioritization level of the data subject access request should be adjusted;

in response to determining that the initial prioritization level of the data subject access request should be adjusted based on the obtained one or more pieces of metadata, adjusting, by the one or more processors, the initial prioritization level of the data subject access request for fulfillment of the data subject access request, wherein adjusting the initial prioritization level of the data subject access request comprises modifying a completion date for fulfillment of the data subject access request based on the adjusted prioritization level of the data subject access request, and updating a prioritization indicator associated with the data subject access request to indicate that the initial prioritization level of the data subject access request has been adjusted; and storing, by the one or more processors, the adjusted prioritization level of the data subject access request in computer memory.

2. The computer-implemented data processing method of claim 1, wherein the prioritization level is one of a first prioritization level and a second prioritization level.

3. The computer-implemented data processing method of claim 1, wherein the metadata comprises the request type associated with the data subject access request and the request type is selected from a group consisting of:

a subject's rights request, and a data subject deletion request.

4. The computer-implemented data processing method of claim 1, wherein:

the prioritization level is adjusted to decrease the prioritization level of the data subject access request; and modifying the completion date for fulfillment of the data subject access request comprises modifying the completion date to a modified completion date that is a later date than the completion date.

5. The computer-implemented data processing method of claim 1, wherein:

the prioritization level is adjusted to increase the prioritization level of the data subject access request; and modifying the completion date for fulfillment of the data subject access request comprises modifying the completion date to a modified completion date that is an earlier date than the completion date.

6. The computer-implemented data processing method of claim 1, wherein:

fulfilling the data subject access request comprises identifying the one or more pieces of personal data associated with the data subject; and identifying the one or more pieces of personal data associated with the data subject comprises scanning one or more data inventories stored within the data system for the one or more pieces of personal data.

7. The computer-implemented data processing method of claim 1, further comprising:

generating a prioritization message to indicate that the prioritization level of the data subject access request has been adjusted; and providing, via electronic communication, the prioritization message to at least one privacy team member that is assigned to fulfill the data subject access request.

8. The computer-implemented data processing method of claim 1, wherein obtaining the one or more pieces of metadata further comprises:
generating a secure link between one or more processors associated with the data subject access request and a computing device associated with the requestor to prevent outside access to the one or more pieces of metadata;
receiving, via the secure link, the one or more pieces of metadata associated with a data subject of the data subject access request; and
digitally storing one or more pieces of metadata in association with a data subject of the data subject access request.

9. The computer-implemented data processing method of claim 1, wherein the one or more pieces of metadata comprise a request type associated with the data subject access request.

10. A computer-implemented data processing method for prioritizing data subject access requests, the method comprising:
receiving, by one or more processors, a data subject access request from a requestor comprising one or more request parameters, wherein the one or more request parameters comprise one or more pieces of personal data associated with the requestor;
validating, by the one or more processors, an identity of the requestor by prompting the requestor to identify information associated with the requestor;
at least partially in response to receiving the data subject access request, obtaining, by the one or more processors, one or more pieces of metadata associated with a data subject of the data subject access request based on the one or more request parameters, wherein the metadata comprises: a request type associated with the data subject access request; a location from which the data subject access request is being made; current sensitivities to world events; a status of the requestor issuing the data subject access request, or a time in which the data subject access request was made;
analyzing, by the one or more processors, the one or more pieces of obtained metadata, wherein analyzing the one or more pieces of obtained metadata comprises identifying information related to a priority for fulfilling the data subject access request;
determining, by the one or more processors, the prioritization level of the data subject access request based on analyzing the one or more pieces of obtained metadata;
applying, by the one or more processor, the prioritization level of the data subject access request based on the determination; and
storing, by the one or more processors, the prioritization level of the data subject access request in computer memory.

11. The computer-implemented data processing method of claim 10, wherein the metadata comprises the request type associated with the data subject access request and the request type is selected from a group consisting of:
a requestor for the data subject access request; and a type for the data subject access request.

12. The computer-implemented data processing method of claim 10, wherein obtaining the one or more pieces of metadata further comprises:
generating a secure link between one or more processors associated with the data subject access request and a computing device associated with the requestor to prevent outside access to the one or more pieces of metadata;
receiving, via the secure link, the one or more pieces of metadata associated with a data subject of the data subject access request; and
digitally storing one or more pieces of metadata associated with a data subject of the data subject access request.

13. The computer-implemented data processing method of claim 10, wherein fulfilling the data subject access request comprises:
Identifying the one or more pieces of personal data associated with the data subject, wherein:
identifying the one or more pieces of personal data associated with the data subject comprises scanning one or more data inventories stored within the data system for the one or more pieces of personal data.

14. The computer-implemented data processing method of claim 10, wherein the metadata comprises a location from which the data subject access request is being made.

15. A computer-implemented data processing method for prioritizing data subject access requests, the method comprising:
receiving, by one or more processors, a data subject access request from a requestor comprising one or more request parameters, wherein the one or more request parameters comprise one or more pieces of personal data associated with the requestor;
at least partially in response to receiving the data subject access request, obtaining, by the one or more processors, one or more pieces of metadata associated with a data subject of the data subject access request based on the one or more request parameters, wherein the metadata is selected from a group consisting of: (1) a request type associated with the data subject access request, (2) a location from which the data subject access request is being made, (3) a status of the requestor issuing the data subject access request, (4) a time in which the data subject access request was made, and (5) current sensitivities to world events;
analyzing, by the one or more processors, the one or more pieces of obtained metadata, wherein analyzing the one or more pieces of obtained metadata comprises identifying information related to a priority for fulfilling the data subject access request;
determining, by the one or more processors, the prioritization level of the data subject access request based on analyzing the one or more pieces of obtained metadata;
the data subject access request based on the analyzed one or more pieces of obtained metadata;
applying, by the one or more processor, the prioritization level of the data subject access request based on the determination; and
storing, by the one or more processors, the prioritization level of the data subject access request in computer memory.

16. The computer-implemented data processing method of claim 15, wherein the metadata comprises the request type associated with the data subject access request and the request type is selected from a group consisting of:
a requestor for the data subject access request; and
a type for the data subject access request.

17. The computer-implemented data processing method of claim 15, wherein obtaining the one or more pieces of metadata further comprises:

generating a secure link between one or more processors associated with the data subject access request and a computing device associated with the requestor to prevent outside access to the one or more pieces of metadata;

receiving, via the secure link, the one or more pieces of metadata associated with a data subject of the data subject access request; and digitally storing one or more pieces of metadata associated with a data subject of the data subject access request.

18. The computer-implemented data processing method of claim 15, wherein fulfilling the data subject access request comprises:

identifying the one or more pieces of personal data associated with the data subject, wherein:

identifying the one or more pieces of personal data associated with the data subject comprises scanning one or more data inventories stored within the data system for the one or more pieces of personal data.

19. The computer-implemented data processing method of claim 15, wherein the one or more pieces of metadata comprise a status of the requestor issuing the data subject access request.

* * * * *